(12) United States Patent
Sakurai

(10) Patent No.: US 9,544,542 B2
(45) Date of Patent: Jan. 10, 2017

(54) TELECONFERENCE MANAGEMENT SERVER DEVICE, TELECONFERENCE MANAGEMENT METHOD AND NON-TRANSITORY COMPUTER-READABLE MEDIUM

(71) Applicant: Brother Kogyo Kabushiki Kaisha, Nagoya-shi, Aichi-ken (JP)

(72) Inventor: Koichi Sakurai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/075,318

(22) Filed: Mar. 21, 2016

(65) Prior Publication Data
US 2016/0295167 A1 Oct. 6, 2016

(30) Foreign Application Priority Data
Mar. 31, 2015 (JP) ................. 2015-073568

(51) Int. Cl.
*H04N 7/15* (2006.01)
(52) U.S. Cl.
CPC ............. *H04N 7/152* (2013.01); *H04N 7/155* (2013.01)
(58) Field of Classification Search
USPC ....................................... 348/14.09
See application file for complete search history.

(56) References Cited

U.S. PATENT DOCUMENTS

| | | | |
|---|---|---|---|
| 2004/0150712 A1* | 8/2004 | Le Pennec | H04N 7/152 348/14.01 |
| 2004/0257434 A1* | 12/2004 | Davis | H04N 7/147 348/14.13 |
| 2012/0262275 A1* | 10/2012 | Schultz | G06F 21/32 340/5.83 |
| 2015/0365707 A1* | 12/2015 | Melanson | H04N 21/2187 725/32 |

FOREIGN PATENT DOCUMENTS

| | | |
|---|---|---|
| JP | 2005-136524 A | 5/2005 |
| JP | 2007-134843 A | 5/2007 |
| JP | 2010-273244 A | 12/2010 |

\* cited by examiner

*Primary Examiner* — Creighton Smith
(74) *Attorney, Agent, or Firm* — Banner & Witcoff, Ltd.

(57) ABSTRACT

First identification information identifying the first terminal device and status information that indicate participation status of the first terminal device are received from a first terminal device. A first request is transmitted to a second terminal device. A first response is received from the second terminal device. The second terminal device is set as a registered second terminal device when the first response is received. First transmission/reception processing is started when the registered second terminal device is set. The first transmission/reception processing transmits first conference data received from the first terminal device to the registered second terminal device, and transmits second conference data received from the registered second terminal device to the first terminal device. The first transmission/reception does not transmit third conference data received from a third terminal device to the registered second terminal device. The third terminal device is different to the first and the second terminal device.

9 Claims, 13 Drawing Sheets

| CONF ROOM ID | USER ID | TERMINAL ID | ROLE INFO |
|---|---|---|---|
| A0001 | U0001 | WT017 | CHAIRPERSON |
|  | U0002 | MR291 | PRESENTER |
|  | U0003 | PB560 | PARTICIPANT |
|  | U0004 | WT348 | SUPPORT STAFF |
| A0002 | ... | ... | ... |

TELECONFERENCE MANAGEMENT SERVER DEVICE, TELECONFERENCE MANAGEMENT METHOD AND NON-TRANSITORY COMPUTER-READABLE MEDIUM

CROSS-REFERENCE TO RELATED APPLICATION

This application claims priority to Japanese Patent Application No. 2015-073568 filed on Mar. 31, 2015, the disclosure of which is herein incorporated by reference in its entirety.

BACKGROUND

The present disclosure relates to a teleconference management server device, a teleconference management method, and a non-transitory computer-readable medium.

A system in known that allows realization of a teleconference by each of a plurality of terminal devices performing communication with the other terminal devices via a conference management server device. When the conference server of the known conference system has received a command from one of conference terminals (a control terminal) for a microphone sensitivity adjustment of another of the conference terminals (a controlled terminal), the conference server displays microphone information of the controlled terminal on the control terminal and receives individual microphone sensitivity adjustment operations. Further, a known remote operation method causes a communication terminal that is a communication counterpart to function as a remote operation source terminal, and causes another communication terminal to function as a controlled remote operation terminal that is remotely operated by the remote operation source terminal.

SUMMARY

There are cases in which a trouble occurs, such as a case in which sound from another of the terminal devices cannot be heard, or video images from a user's own terminal device are not reaching the other terminal devices etc., due to settings (a microphone sensitivity level setting, device settings of a camera or the like, etc.) of a device connected to the terminal device, and the user is unable to participate appropriately in the teleconference. When the user is not accustomed to using the terminal device, there is a case in which the user is unable to identify the cause of the trouble that is occurring. In this regard, there is a case in which a user of another of the terminal devices participating in the teleconference can resolve the trouble by performing operations to change the device settings of the user's terminal device on which the trouble has occurred. However, it is possible that, as a result of performing the operations to resolve the trouble during the teleconference, the user of the other terminal device may neglect to participate in the teleconference.

Alternatively, it is conceivable that the user of the terminal device on which the trouble is occurring makes a request, to another terminal device that is not participating in the teleconference, to participate in the teleconference. In this case, a situation arises in which a person who is not an original participant of the teleconference participates in the teleconference. In the teleconference, conference data is transmitted and received between each of the terminal devices, and there is a possibility that the conference data may leak to the person who is not the original participant in the teleconference, and that confidentiality of the conference data thus deteriorates.

Various embodiments of the general principles described herein provide a teleconference management server device, a teleconference management method, and a non-transitory computer-readable medium that are capable of dealing with a trouble that has occurred in a terminal device, without causing a deterioration in confidentiality of conference data.

Embodiments herein provide a non-transitory computer-readable medium storing computer-readable instructions. The computer-readable instructions cause a processor of a teleconference management server device configured to manage a teleconference via network to perform steps including: receiving, from a first terminal device participating in the teleconference, first identification information identifying the first terminal device, and status information indicating a participation status in the teleconference of the first terminal device; transmitting a first request including the first identification information and the status information to a second terminal device being a terminal device that is set in advance and that is not participating in the teleconference; receiving, from the second terminal device, a first response in response to the first request; setting, in response to receiving the first response, the second terminal device as a registered second terminal device whose participation in the teleconference is registered; and starting first transmission/reception processing in response to setting the registered second terminal device. The first transmission/reception processing transmits first conference data received from the first terminal device to the registered second terminal device, transmits second conference data received from the registered second terminal device to the first terminal device, and does not transmit third conference data received from a third terminal device participating in the teleconference to the registered second terminal device. The third terminal device is different to the first terminal device and the second terminal device.

Embodiments herein also provide a teleconference management method via a network. The method includes the steps of: receiving, from a first terminal device participating in a teleconference, first identification information identifying the first terminal device, and status information indicating a participation status in the teleconference of the first terminal device; transmitting a first request including the first identification information and the status information to a second terminal device being a terminal device that is set in advance and that is not participating in the teleconference; receiving, from the second terminal device, a first response in response to the first request; setting, in response to receiving the first response, the second terminal device as a registered second terminal device whose participation in the teleconference is registered; receiving conference data in response to setting the registered second terminal device; identifying a transmission destination of the conference data, based on information included in the received conference data, such that when the first identification information is included in the conference data, the second terminal device is identified as the transmission destination, when second identification information identifying the second terminal device, is included in the conference data, the first terminal device is identified as the transmission destination, and when third identification information identifying a third terminal device participating in the teleconference, is included in the conference data, at least a part of a plurality of terminal devices including the first terminal device and at least one of the third terminal devices and not including the second terminal device is identified as the transmission destination, the third terminal device being different to the first terminal device and the second terminal device; and transmitting the conference data to the identified transmission destination.

Embodiments herein also provide a teleconference management server device configured to manage a teleconference via a network. The teleconference management server device is provided with a processor configured to control the device to perform the steps of: receiving, from a first terminal device participating in the teleconference, first identification information identifying the first terminal device, and status information indicating a participation status in the teleconference of the first terminal device; transmitting a first request including the first identification information and the status information to a second terminal device being a terminal device that is set in advance and that is not participating in the teleconference; receiving, from the second terminal device, a first response in response to the first request; setting, in response to receiving the first response, the second terminal device as a registered second terminal device whose participation in the teleconference is registered; and starting first transmission/reception processing in response to setting the registered second terminal device. The first transmission/reception processing transmits first conference data received from the first terminal device to the registered second terminal device, transmits second conference data received from the registered second terminal device to the first terminal device, and does not transmit third conference data received from a third terminal device participating in the teleconference to the registered second terminal device. The third terminal device is different to the first terminal device and the second terminal device.

BRIEF DESCRIPTION OF THE DRAWINGS

Embodiments will be described below in detail with reference to the accompanying drawings in which.

DETAILED DESCRIPTION

Figure 1:
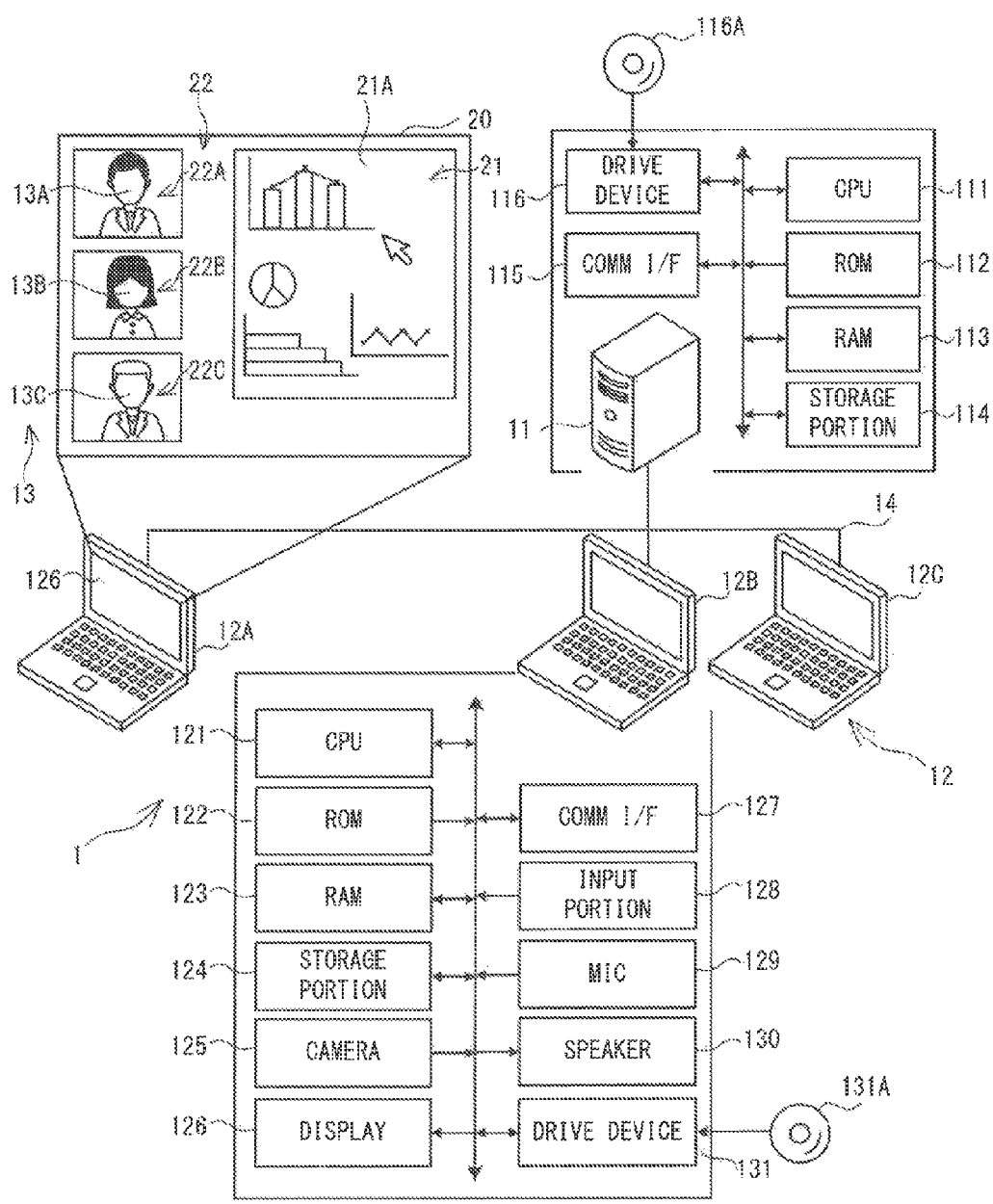
FIG. 1 is a diagram showing an overview of a teleconference system, and an electrical configuration of a conference management server device and terminal devices.

A teleconference system 1 will be explained with reference to FIG. 1. The teleconference system 1 is provided with a conference management server device 11 and terminal devices 12A, 12B and 12C. Note that, when the terminal devices 12A, 12B and 12C are not particularly distinguished from each other, or when they are collectively referred to, they are simply referred to as the "terminal device 12" or the "terminal devices 12." The conference management server device 11 and the terminal devices 12 are communicatively connected, via a network 14, which includes the Internet, a LAN, another dedicated circuit or the like. The teleconference system 1 is a system that, by providing a virtual conference room to each of users of the terminal devices 12, causes a teleconference to be realized between the respective users.

The conference management server device 11 is configured by installing an application that is used to perform support processing (refer to FIG. 3) and trouble identification processing (refer to FIG. 6), both of which will be described later, on a known server or a multi-point control unit (MCU). The terminal device 12 is configured by a known general-purpose personal computer (PC), a known general-purpose mobile terminal, or a known general-purpose tablet terminal. In the teleconference system 1 according to the present embodiment, a PC using the Windows (registered trademark) OS, a PC using the Mac OS, or a mobile terminal or a tablet terminal that operates using iOS (registered trademark) can be used as the terminal 12. Note that the conference management server device 11 may be configured by installing the application on a general-purpose server. At least one of the terminal devices 12 may be configured by installing the application on a dedicated terminal for teleconference use.

An electrical configuration of the conference management server device 11 will be explained. As shown in FIG. 1, the conference management server device 11 is provided with a CPU 111 that controls the conference management server device 11. The CPU 111 is electrically connected to a ROM 112, a RAM 113, a storage portion 114, a communication interface (I/F) 115, and a drive device 116. The ROM 112 stores a boot program, a BIOS and the like. The RAM 113 temporarily stores various data, such as calculation results etc. obtained in arithmetic processing by the CPU 111. The storage portion 114 is configured by a computer-readable non-transitory storage medium, such as a hard disk or the like. The storage portion 114 stores an application program (hereinafter sometimes simply referred to as a "program") that is used by the CPU 111 to perform processing, and an OS. Further, a conference table 40 (refer to FIG. 2) that will be described later is stored in the storage portion 114. It should be noted that the storage portion 114 may be configured by another non-transitory storage medium, such as a flash memory and/or a ROM or the like. It is sufficient that the non-transitory storage medium be a storage medium capable of storing information, regardless of a period of storage of the information. The non-transitory storage medium need not necessarily include a temporary storage medium (such as a transmission signal, for example).

The communication I/F 115 is a terminal element that is used to connect the conference management server device 11 to the network 14. The communication I/F 115 is an interface terminal (a LAN card etc., for example) used to connect the conference management server device 11 to the network 14, or an interface terminal (a Wi-Fi communication modem etc. for example) used to perform wireless communication by being connected to an access point (not shown in the drawings) by which the conference management server device 11 is connected to the network 14. The CPU 111 performs transmission and reception of data with another device connected to the network 14 via the communication I/F 115. The drive device 116 can read out information stored in a storage medium 116A. The CPU 111 can read out the program stored in the storage medium 116A using the drive device 116, and can store the read-out program in the storage portion 114. The storage medium 116A is a non-transitory storage medium, such as an optical medium or the like.

An electrical configuration of the terminal device 12 will be explained. As shown in FIG. 1, the terminal device 12 is provided with a CPU 121 that controls the terminal device 12. The CPU 121 is electrically connected to a ROM 122, a RAM 123, a storage portion 124, a camera 125, a display portion 126, a communication I/F 127, an input portion 128, a microphone 129, a speaker 130, and a drive device 131.

The ROM 122 stores a boot program, a BIOS and the like. The RAM 123 temporarily stores various data, such as calculation results etc. obtained in arithmetic processing by the CPU 121. The storage portion 124 is configured by a computer-readable non-transitory storage medium, such as a hard disk or the like. The storage portion 124 stores the program that is used by the CPU 121 to perform processing, and the OS. It should be noted that the storage portion 124 may be configured by another non-transitory storage medium, such as a flash memory and/or a ROM or the like. It is sufficient that the non-transitory storage medium be a storage medium capable of storing information, regardless of a period of storage of the information. The non-transitory storage medium need not necessarily include a temporary storage medium (such as a transmission signal, for example).

The display portion 126 is a liquid crystal display (LCD). The communication I/F 127 is an interface terminal (a LAN card etc., for example) used to connect the terminal device 12 to the network 14, or an interface terminal (a Wi-Fi communication modem etc. for example) used to perform wireless communication by being connected to an access point (not shown in the drawings) by which the terminal device 12 is connected to the network 14. The CPU 121 performs transmission and reception of data with another device connected to the network 14 via the communication I/F 127. The input portion 128 includes, for example, a button, a keyboard, or a mouse. The drive device 131 can read out information stored in a computer-readably storage medium 131A, which is a semi-conductor memory or the like. The CPU 121 can read out the program stored in the storage medium 131A by using the drive device 131, and can store the read-out program in the storage portion 124.

Note that a general-purpose processor may be used as the CPU 111 of the conference management server device 11 and the CPU 121 of the terminal device 12. A part of the processing performed by the CPUs 111 and 121 may be performed by another electronic component (such as an ASIC, for example). The processing performed by the CPUs 111 and 121 may be performed as distributed processing by a plurality of electronic components (such as a plurality of CPUs, for example). The processing performed by the CPU 111 of the conference management server device 11 may be performed by another server connected to the network 14, for example, or may be performed by the CPU 121 of the terminal device 12. The program may be downloaded from another server connected to the network 14 (namely, be transmitted as a transmission signal), for example, and stored in the storage portion 114 of the conference management server device 11 and in the storage portion 124 of the terminal device 12. In this case, the program is stored in a non-transitory storage medium, such as an HDD or the like, provided in the above-described other server.

A procedure, when a user 13 of the terminal device 12 uses the virtual conference room (hereinafter simply referred to as the "conference room") provided by the conference management server device 11, will be explained while giving a specific example. First, a user 13A of the terminal device 12A inputs a user ID and a password of the user 13A, and logs in to the teleconference system 1. Next, the user 13A transmits an electronic mail (e-mail), addressed to e-mail addresses of the terminal devices 12B and 12C used by users 13B and 13C, in order to invite the users 13B and 13C to the conference room hosted by the user 13A. This e-mail includes a uniform resource locator (URL) that is necessary for the users 13B and 13C to join the conference room. The URL includes a conference room ID, which is identification information to identify the conference room.

Next, the user 13A operates the terminal device 12A and activates a conference application. The user 13A performs an input operation to enter the conference room hosted by the user 13A. When the CPU 121 of the terminal device 12A detects the input operation, the CPU 121 of the terminal device 12A transmits the conference room ID of the conference room hosted by the user 13A to the conference management server device 11. The terminal device 12A performs communication with the conference management server device 11 and performs known conference connection processing. As a result of the conference connection processing, the CPU 111 of the conference management server device 11 establishes a session of the conference room indicated by the conference room ID with the terminal device 12A.

Meanwhile, the CPU 121 of the terminal device 12B receives the e-mail transmitted from the terminal device 12A, and causes the URL to be displayed on the display portion 126. The user 13B performs an input operation to select the URL. When the CPU 121 of the terminal device 12B detects the input operation, the CPU 121 of the terminal device 12B activates the conference application. The CPU 121 of the terminal device 12B transmits the conference room ID included in the URL to the conference management server device 11. The terminal device 12B performs communication with the conference management server device 11 and performs the conference connection processing. As a result of the conference connection processing, the CPU 111 of the conference management server device 11 establishes the session of the conference room indicated by the conference room ID with the terminal device 12B. The same operations are performed with the terminal device 12C.

In the above-described manner, the conference connection is established between the conference management server device 11 and the terminal devices 12, and a state is obtained in which the users 13A to 13C have joined the conference room hosted by the user 13A. When the conference application is executed by the CPU 121 of the terminal device 12, a conference application main window (hereinafter referred to as a "main window") 20 shown in FIG. 1 is displayed on the display portion 126. The main window 20 includes a document window 21 and video windows 22A, 22B, and 22C. Hereinafter, when the video windows 22A, 22B, and 22C are collectively referred to, they are referred to as the "video window 22" or the "video windows 22." In the main window 20, the document window 21 is arranged on the right side, and the video windows 22 are arranged on the left side. Documentation 21A, which is shared in the conference room, is displayed on the document window 21.

The video windows 22A, 22B, and 22C are aligned in the vertical direction. Video images that are displayed in the video windows 22A, 22B, and 22C respectively correspond to video images captured by the cameras 125 of each of the terminal devices 12A, 12B and 12C participating in the conference room. In the case of FIG. 1, the video images of the user 13A of the terminal device 12A are displayed in the video window 22A, the video images of the user 13B of the terminal device 12B are displayed in the video window 22B, and the video images of the user 13C of the terminal device 12C are displayed in the video window 22C.

In addition, when the conference application is executed by the CPU 121 of the terminal device 12, sound of audio etc. collected by the microphones 129 of the other terminal devices 12 is output from the speakers 130. In other words, in the teleconference system 1, the terminal device 12 transmits, to the conference management server device 11, sound data generated from the sound acquired by the terminal device 12, and video data generated from the video images acquired by the terminal device 12. The conference management server device 11 distributes the sound data and the video data transmitted from the terminal device 12 to the other terminal devices 12. As a result, the user 13 can perform the teleconference with the other users 13 while verifying the video images and the sound of the other users 13 participating in the conference room. In the present embodiment, various data, which includes the above-described sound data and video data and which is transmitted and received between the conference management server device 11 and the terminal devices 12 in the conference room session, is referred to as "conference data." A header area of the conference data includes, for example, information identifying which of the terminal devices 12 is the terminal device 12 that is the transmission source (a user ID or a terminal device ID both of which will be described later, for example), and information identifying a type of the data.

The user 13 that is the host of the conference room, and the users 13 invited to join the conference room by the host of the conference room are assigned a role of either "Chairperson," "Presenter," or "Participant." These roles indicate a mode of participation of each of the users 13 in the conference room. "Chairperson" indicates the host of the conference room. "Presenter" indicates the user 13 who makes an explanation, using document data etc., to the other users 13 participating in the conference room. "Participant" indicates, of the users 13 participating in the conference room, the user 13 who is not the "Chairperson" and the "Presenter."

The above-described conference application can provide a plurality of functions relating to the conference room to the users 13. The plurality of functions are, for example, a "Sound" function, a "Video" function, a "Document sharing" function, a "Chat" function, a "File transfer" function, a "Video recording" function, a "Desktop sharing" function, a "Document printing" function, a "Whiteboard" function, a "Remote desktop" function, a "Notify by audio when other station joins conference" function, and a "Display pop-up when other station joins conference" function. A detailed content of each of the plurality of functions will be explained below.

The "Sound" function is a function to output, from the speaker 130, the sound collected by the microphones 129 of the other terminal devices 12. The "Video" function is a function to display the video images captured by the cameras 125 of the other terminal devices 12. The "Document sharing" function is a function to start sharing the document data with the other terminal devices 12 by transmitting the document data to be shared with the other terminal devices 12 to the conference management server device 11. The "Chat" function is a chat function. The "File transfer" function is a function to perform the transfer of files with the other terminal devices 12. The "Video recording" function is a function to record the video images, the sound, and the shared documentation of the conference. The "Desktop sharing" function is a function to share the desktop with the other terminal devices 12. The "Document printing" function is a function to print the document shared when using the "Document sharing" function. The "Whiteboard" function is a function to share a virtual whiteboard with the other terminal devices 12. The "Remote desktop" function is a function to remotely operate the desktops of the other terminal devices 12. The "Notify by audio when other station joins conference" function is a function to notify the other users 13 participating in the conference room, using sound, when one of the users 13 of the terminal device 12 joins the conference room partway through the conference. The "Display pop-up when other station joins conference" function is a function to notify the other users 13 participating in the conference room, using video images, when one of the users 13 of the terminal device 12 joins the conference room partway through the conference.

Most of the above-described functions that can be performed in the conference room are set for the "Chairperson," among the participants in the conference room. In the present embodiment, the "Chairperson" can use all of the above-described functions. In contrast, for example, the "Presenter" can use, of the above-described functions, the functions excluding the "Document printing" and "Whiteboard" functions. Further, for example, the "Participant" can use, of the above-described functions, the functions excluding the "File transfer," "Video recording," "Desktop sharing," "Document printing" and "Whiteboard" functions. A number of the functions that can be used by the participants in the conference room becomes fewer from the "Chairperson" (who has the greatest number of functions) to the "Presenter" and then to the "Participant." In order to allow the "Chairperson" to smoothly host the conference room session, the teleconference system 1 assigns the highest level of specific authority described above to the "Chairperson," among the participants in the conference room. When the terminal device 12 is the PC using the Windows (registered trademark) OS, or the PC using the Mac OS, the functions that can be used according to each of the roles are as described above. On the other hand, when the terminal device 12 is the mobile terminal or the tablet terminal that operates using iOS (registered trademark), the user 13 cannot use the "Document sharing," "Desktop sharing," and "Whiteboard" functions. Note that the plurality of usable functions, and the functions that can be used by the users according to each of their roles are not limited to the above-described example.

A method of trouble support in the teleconference system 1 of the present embodiment will be explained. In the conference room session, there is a case in which, due to device settings of the camera 125, the microphone 129, and the speaker 130 etc. connected to the terminal device 12, the sound from the other terminal devices 12 cannot be heard, or the video images from one's own terminal device 12 do not reach the other terminal devices 12. In this type of case, there is a case in which the user 13 of the terminal device 12 cannot appropriately acquire information from the conference being conducted in the conference room. For example, when the user 13 of the terminal device 12 is not accustomed to operating the terminal device 12, the user 13 may not be able to identify a cause of device trouble that is occurring, or may not be able to properly carry out adjustments to device settings. In this type of case, the teleconference system 1 receives a request for support, in order to solve the trouble, from the terminal device 12 on which the device trouble is occurring. Hereinafter, the terminal device 12 on which the device trouble is occurring is referred to as a "faulty terminal."

The CPU 121 of the faulty terminal generates a support request notification, in accordance with receiving, via the input portion 128, an input operation by the user 13 of the faulty terminal that requests the teleconference system 1 for support to resolve the trouble. The support request notification is data in order to make the request, to the teleconference system 1, for support to resolve the trouble. The CPU 121 of the faulty terminal transmits the support request notification to the conference management server device 11. The conference management server device 11 that has received the support request notification from the faulty terminal during the conference room session, requests a support staff member to participate in the conference room in order to resolve the trouble on the faulty terminal. The support staff member is, for example, an IT engineer who is standing by, at a company that operates the teleconference system 1, to respond to the support request notification. The terminal device 12 of the support staff member is the terminal device 12 that is set in advance in the teleconference system 1, and is the terminal device 12 that is not participating in the conference room. The CPU 121 of the terminal device 12 of the support staff member who has received the support participation request generates a support response notification, which is data indicating that the support staff member will respond to the support participation request. The CPU 121 of the terminal device 12 of the support staff member transmits the support response notification to the conference management server device 11. The CPU 111 that has received the support response notification assigns a role of "Support staff" to the support staff member and causes the support staff member to join the conference room. Hereinafter, the terminal device 12 of the support staff member assigned the role of support staff is referred to as a "support terminal."

There is a possibility that information, such as classified information, which is confidential and which should only be shared among the users 13 participating in the conference room, may be included in the content of the conference being conducted in the conference room. In contrast to the chairperson, and the presenter and the participants invited to the conference room by the chairperson, it can be said that the support staff participating in the conference room in response to the notification from the conference management server device 11 is not an original participant in the conference room. Thus, for example, if the conference connection of the support terminal to the conference room is the same participation mode as that of the other terminal devices 12, there is a possibility of a problem occurring in which the confidentiality of the conference data is not sufficiently secured, due to the content of the conference data becoming known to the support staff via the support terminal. In the present embodiment, the teleconference system 1 limits the role of the support staff to resolving the device trouble of the faulty terminal, and does not allow the conference data being transmitted and received by the original participants in the conference room to be transmitted to the support terminal, thus protecting the confidentiality of the conference data. By carrying out the method of trouble support of the present embodiment, the teleconference system 1 can provide a conference environment that allows the users 13 participating in the conference room to attend the conference with peace of mind, even when device trouble occurs in the terminal device 12.

Figure 2:
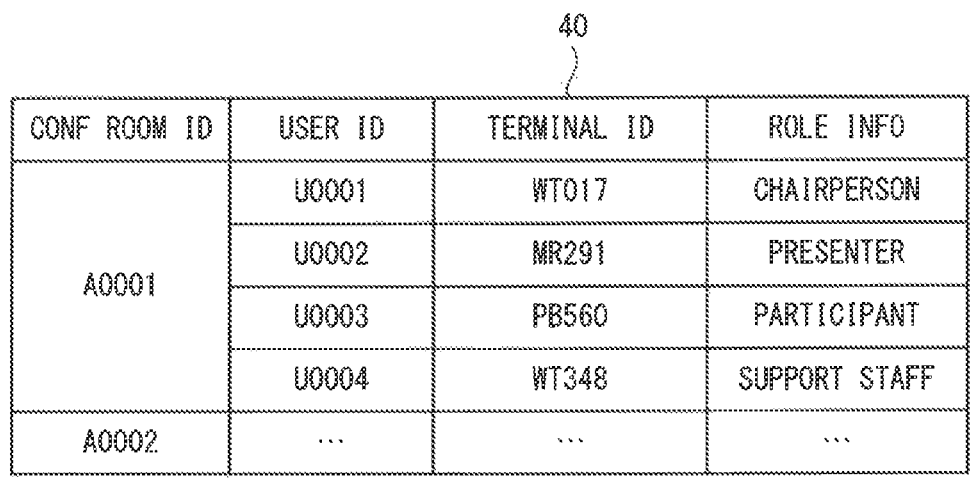
FIG. 2 is a diagram showing a conference table.

The conference table 40 will be explained with reference to FIG. 2. Conference information, which is set for each conference room, is registered in the conference table 40. In the conference table 40, items "User ID," "Terminal device ID" and "Role information" are associated with the "Conference room ID." As described above, the "Conference room ID" is the identification information identifying the conference room. The "User ID" is identification information identifying the user 13 participating in the conference room identified by the conference room ID. The "Terminal device ID" is identification information identifying the terminal device 12 used by the user 13 identified by the corresponding user ID. The "Role information" indicates the role, with respect to the conference room, of each of the users 13 identified by the corresponding user IDs. The "Role information" includes the roles of "Chairperson," "Presenter," "Participant," and "Support staff."

The CPU 111 of the conference management server device 11 performs authentication by comparing the terminal device ID of the terminal device 12 of the user 13 requesting to join the conference room identified by the conference room ID with the terminal device ID registered in the conference table 40. Then, the CPU 111 performs the conference connection processing by performing communication with the terminal device 12 of the user 13 who has been successfully authenticated. Through the conference connection processing, the CPU 111 establishes the session of the conference room indicated by the conference room ID with the terminal device 12. Although not shown in the drawings, the conference table 40 may also include items such as a password etc. that is used to decide the authentication to join the conference room.

Processing performed by the CPU 111 of the conference management server device 11 will be explained with reference to FIG. 3. When the conference room session is established, the CPU 111 starts the support processing (refer to FIG. 3) by executing the program stored in the storage portion 114. Below, a specific explanation will be made in which the terminal device 12A is a chairperson terminal, the terminal device 12B is the faulty terminal, and the terminal device 12C is the terminal device of the support staff member, namely, is the support terminal. Note that the chairperson terminal is the terminal device 12 to which the role of chairperson is assigned, in the conference room session.

Figure 3:
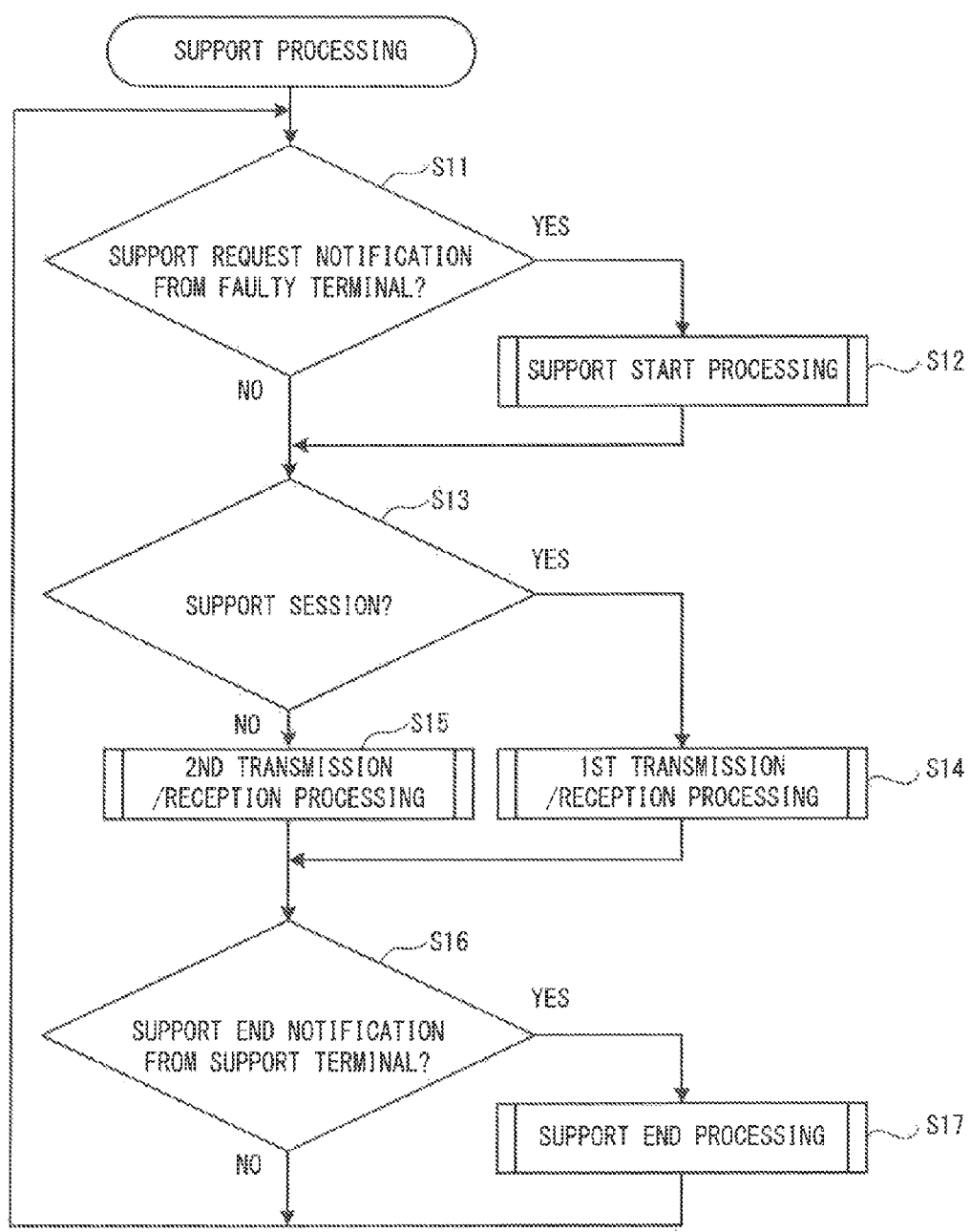
FIG. 3 is a flow chart of support processing.

As shown in FIG. 3, when the support processing is started, the CPU 111 determines whether or not the support request notification has been received from the faulty terminal (step S11). When the support request notification has not been received from the faulty terminal, or when there is no faulty terminal in the conference room session (no at step S11), the CPU 111 moves the processing to a determination at step S13. When the support request notification has been received from the faulty terminal (yes at step S11), the CPU 111 performs support start processing shown in FIG. 4 (step S12) and then moves the processing to the determination at step S13.

Figure 4:
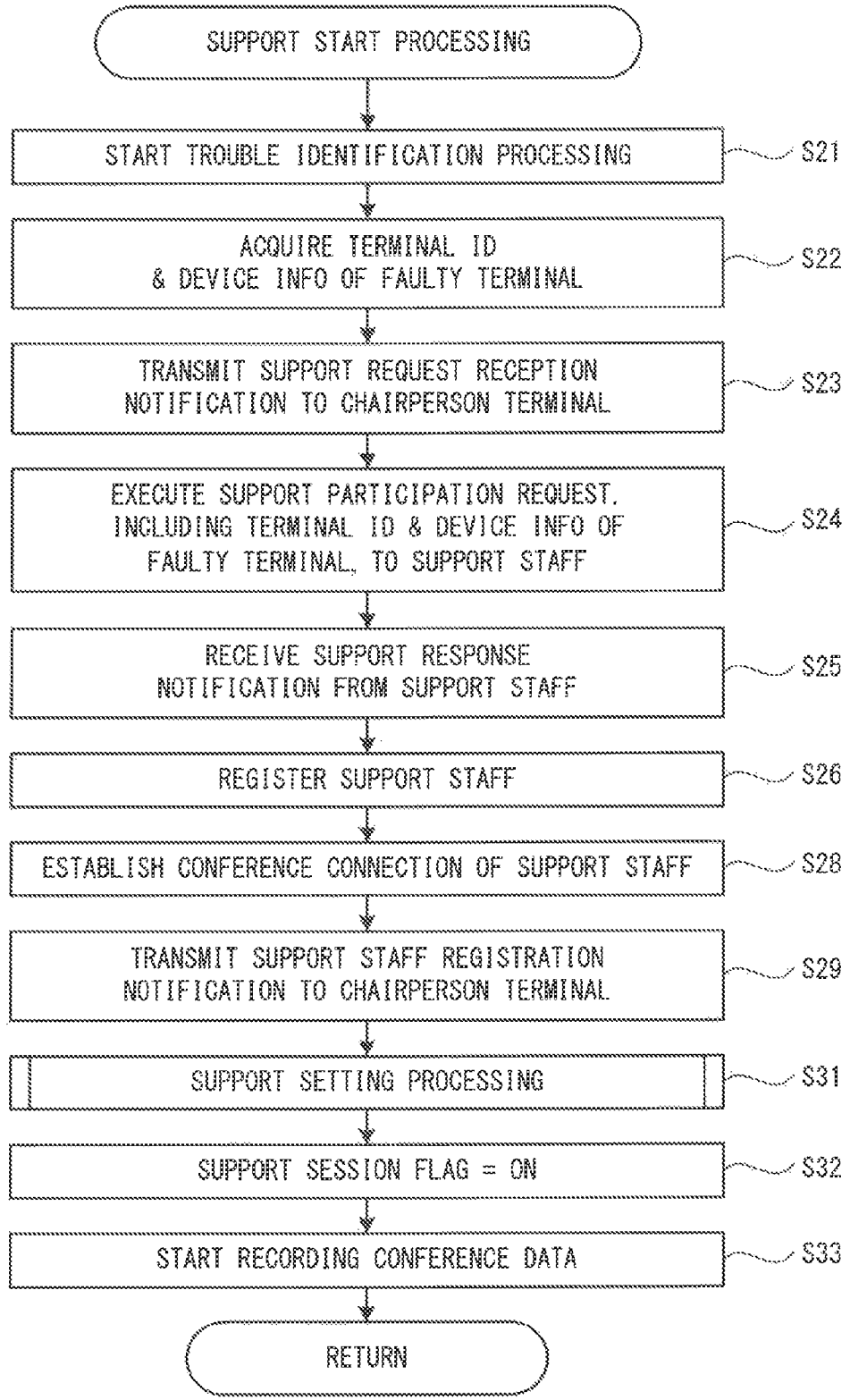
FIG. 4 is a flow chart of support start processing.

The support start processing (refer to step S12, FIG. 3), will be explained with reference to FIG. 4. The support start processing is processing to perform the conference connection to connect the terminal device 12C of the support staff member to the conference room session, and to perform various settings in order to cause the support terminal to engage in resolving the trouble of the faulty terminal. As shown in FIG. 4, when the support start processing is started, the CPU 111 starts performing trouble identification processing (refer to FIG. 6) that will be described later (step S21).

In the present embodiment, the conference application is configured such that, when the faulty terminal transmits the support request notification, the terminal device ID of the faulty terminal and device information of the faulty terminal are also transmitted together with the support request notification. In other words, the support request notification includes the terminal device ID and the device information of the faulty terminal. Note that the device information is information that allows the type of OS of the faulty terminal to be identified (namely, whether the faulty terminal is the PC using the Windows (registered trademark) OS, the PC using the Mac OS (registered trademark), or the mobile terminal or the tablet terminal that operates using iOS (registered trademark). The device information may also include information about the devices connected to the faulty terminal, such as the camera 125, the microphone 129, the speaker 130 and the like. The CPU 111 acquires the terminal device ID and the device information of the faulty terminal that are included in the support request notification (step S22). The CPU 111 stores the acquired terminal device ID and device information of the faulty terminal in the RAM 113.

Figure 11:
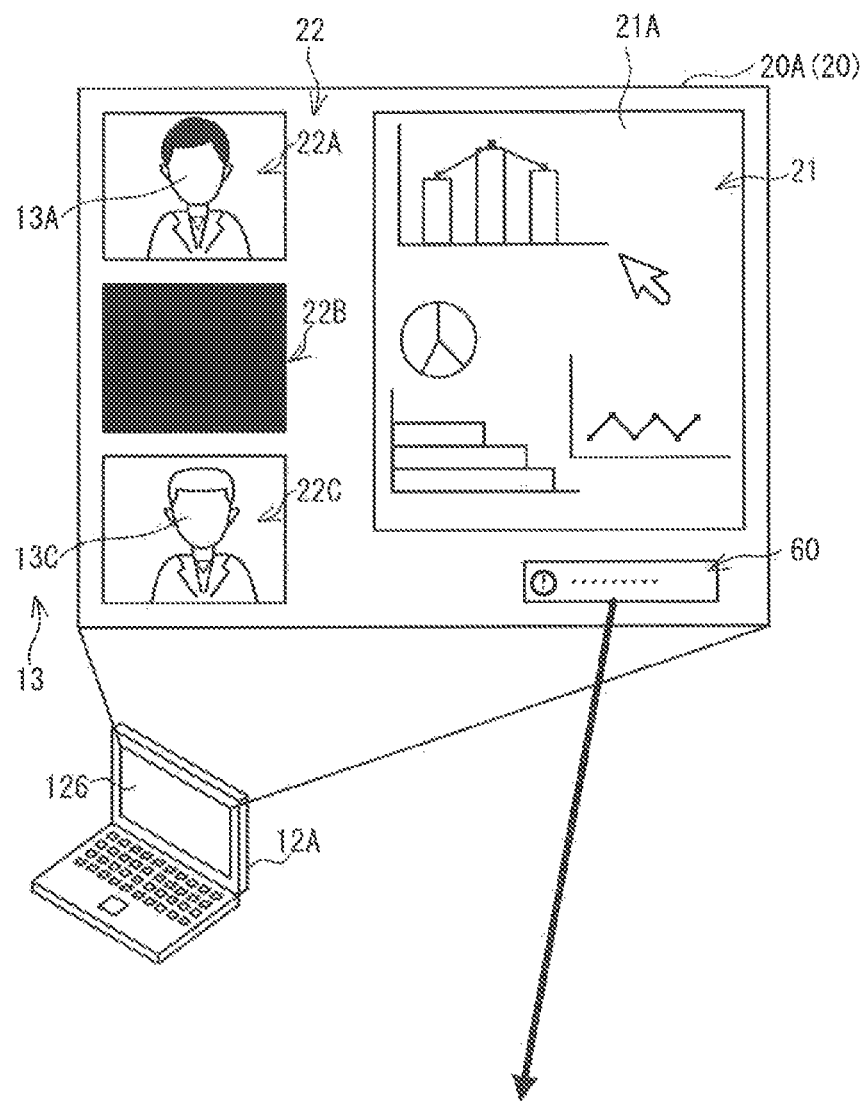
FIG. 11 is a diagram showing a main window and a pop-up display.

The CPU 111 transmits a support request reception notification to the chairperson terminal (step S23). The support request reception notification is data to notify the chairperson terminal that the support request notification has been received from the faulty terminal. As shown in FIG. 11, in the present embodiment, when the chairperson terminal receives a predetermined command, the conference application causes a predetermined pop-up display 60 to be displayed on a main window 20A of the display portion 126 of the chairperson terminal. When the CPU 121 of the chairperson terminal receives the support request reception notification, a support request reception notification display 61 (shown in FIG. 11) is displayed as the pop-up display 60. The chairperson, who is the user 13A of the chairperson terminal, can ascertain that the support request has been transmitted to the teleconference system 1 from the faulty terminal during the conference room session, by visually recognizing the support request reception notification display 61. The chairperson can smoothly conduct the conference while ascertaining that there is the faulty terminal in the conference room session.

The CPU 111 executes the support participation request to the terminal device 12C of the support staff member (step S24). The support participation request to the terminal device 12C of the support staff member by the CPU 111 is executed by transmitting an e-mail to the e-mail address of the terminal device 12C of the support staff member. A URL that includes the conference room ID to which the faulty terminal is conference-connected is included in this e-mail. The e-mail that is transmitted to the terminal device 12C of the support staff member includes the terminal device ID and the device information of the faulty terminal acquired at step S22. Thus, the support staff member who has checked the e-mail via the terminal device 12C can ascertain which of the terminal devices 12 is the faulty terminal and can also ascertain the device information of the faulty terminal.

The CPU 111 receives the support response notification from the terminal device 12C of the support staff member (step S25). The CPU 111 associates the user ID and the terminal device ID of the terminal device 12C of the support staff member, and the role information of "Support staff" with the corresponding conference room ID, and registers the associated information in the conference table 40 of the storage portion 114 (step S26). In the present embodiment, the terminal device 12C of the support staff member is set in advance in the teleconference system 1. The CPU 111 registers, in the conference table 40 of the storage portion 114, the user ID, the terminal device ID, and the role information of the terminal device 12C of the support staff member that is set in advance. The CPU 111 performs authentication by comparing the terminal device ID of the terminal device 12C of the support staff member that has transmitted the support response notification with the terminal device ID registered in the conference table 40. The CPU 111 performs communication with the terminal device 12C of the support staff member for which the authentication has been successful, and performs the conference connection processing (step S28). As a result of the conference connection processing, the CPU 111 causes the session of the conference room indicated by the conference room ID to be established with the terminal device 12C of the support staff member. In this way, the terminal device 12C of the support staff member is conference-connected to the conference room as the support terminal.

The CPU 111 transmits a support staff registration notification to the chairperson terminal (step S29). The support staff registration notification is data to notify the chairperson terminal that the support response notification has been received from the terminal device 12C of the support staff member, that the terminal device 12C has been registered in the conference table 40 as the support staff, and that the terminal device 12C is conference-connected to the conference room as the support terminal. When the CPU 121 of the chairperson terminal has received the support staff registration notification, a support staff registration notification display 62 shown in FIG. 11 is displayed as the pop-up display 60. The chairperson who is the user 13A of the chairperson terminal can visually recognize the support staff registration notification display 62 and can thus ascertain that the support terminal is conference-connected to the conference room session. The chairperson can smoothly conduct the conference while ascertaining that the support terminal has joined the conference room session.

The CPU 111 performs support setting processing (step S31). The support setting processing is processing to perform communication settings so that the support terminal can smoothly respond to the device trouble occurring in the faulty terminal.

The support setting processing (refer to step S31 in FIG. 4) will be explained with reference to FIG. 5. When the support setting processing is started, the CPU 111 refers to the device information of the faulty terminal stored in the RAM 113 in the processing at step S22 (refer to FIG. 4). As described above, the functions that can be used by the terminal device 12 in the conference room differ depending on whether the terminal device 12 is the PC or is the mobile terminal or the tablet terminal that operates using iOS (registered trademark). In order to allow the support terminal to appropriately respond to the device trouble of the faulty terminal, it is necessary for the teleconference system 1 to cause the support terminal and the faulty terminal to communicate with each other using functions in accordance with the device information of the faulty terminal.

Based on the device information referred to at step S41, the CPU 111 determines whether or not the faulty terminal is the PC with the Windows (registered trademark) OS or the Mac OS (step S42). When the faulty terminal is the PC (yes at step S42), the CPU 111 performs various communication settings such that the faulty terminal and the support terminal can communicate with each other using the sound, video, chat, video recording, and remote desktop functions (step S43). The CPU 111 moves the processing to a determination at step S45. On the other hand, when the faulty terminal is the mobile terminal or the tablet terminal (no at step S42), the CPU 111 performs various communication settings such that the faulty terminal and the support terminal can communicate with each other using the sound, video, chat, and video recording functions (step S44). The CPU 111 moves the processing to the determination at step S45.

The CPU 111 determines whether or not a trouble questionnaire response (to be described later) has been received (step S45). When the trouble questionnaire response has not been received (no at step S45), the CPU 111 repeats the determination at step S45 until the trouble questionnaire response is received.

When the trouble questionnaire response has been received (yes at step S45), the CPU 111 refers to the trouble questionnaire response that is stored in the RAM 113 by processing at step S53 of trouble identification processing (refer to FIG. 6) that will be described later, and performs communication settings in accordance with the trouble questionnaire response (step S47). For example, when the trouble questionnaire response specifies that the device trouble of the faulty terminal is caused by trouble with the microphone 129 or the speaker 130, the CPU 111 performs various communication settings so that the faulty terminal and the support terminal can communicate with each other using functions other than the sound function. When the trouble questionnaire response specifies that the device trouble of the faulty terminal is caused by trouble with the camera 125, the CPU 111 performs various communication settings so that the faulty terminal and the support terminal can communicate with each other using functions other than the video and video recording functions. By performing the communication settings between the faulty terminal and the support terminal in the above-described manner, the CPU 111 causes a support session to be established between the faulty terminal and the support terminal in order for the support terminal to support the faulty terminal in resolving the device trouble. The CPU 111 stores the setting content from the processing at step S43 or step S44, and the processing at step S47 in the RAM 113, and ends the support setting processing. The CPU 111 returns the processing to the support start processing (refer to FIG. 4).

The explanation returns to the explanation of FIG. 4. The CPU 111 sets a support session flag to "ON" (step S32). The support session flag is a flag indicating that the support session between the faulty terminal and the support terminal is established. The support session flag is stored in the RAM 113. When the support session is established, "1" is stored in the RAM 113 and the support session flag is "ON," and when the support session is not established, "0" is stored in the RAM 113 and the support session flag is "OFF."

The CPU 111 starts recording the conference data (step S33). Specifically, the CPU 111 causes the conference data subsequently transmitted and received between the conference management server device 11 and the terminal devices 12 to be stored in the storage portion 114. After the support session is established, various communication is performed between the faulty terminal and the support terminal in order to resolve the device trouble of the faulty terminal. Although the faulty terminal is conference-connected to the conference room session, there is a case in which the user 13B of the faulty terminal fails to properly follow the content of the conference, due to being pressured by the communication with the support terminal and various operations to resolve the device trouble. After the support session is established, the CPU 111 records the conference data, and thus the user 13B of the faulty terminal can ascertain the content of the conference data by accessing the recording of the conference data stored in the storage portion 114 after the conference room session has ended, for example. The CPU 111 ends the support start processing and returns the processing to the support processing (refer to FIG. 3).

Figure 6:
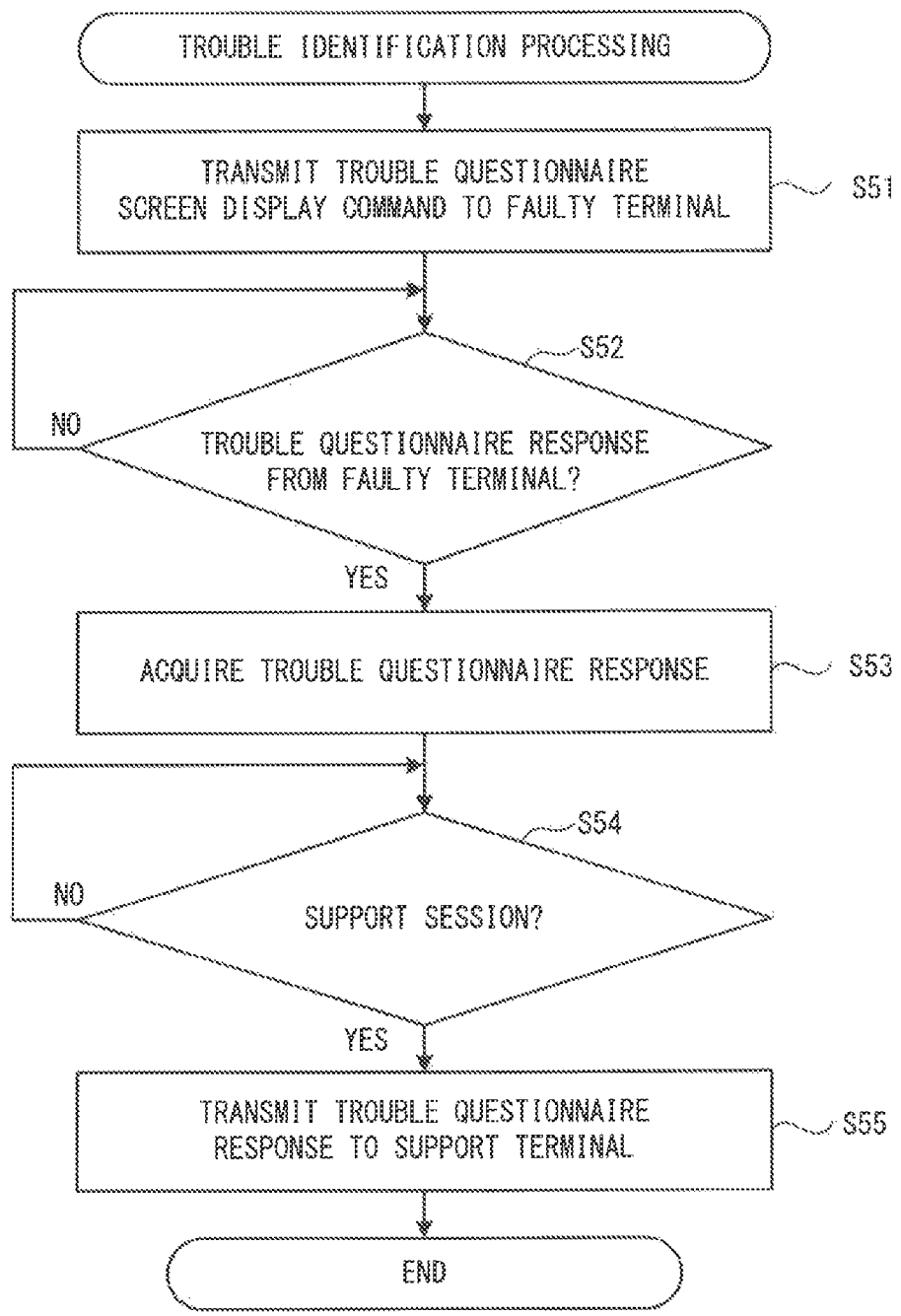
FIG. 6 is a flow chart of trouble identification processing.

The trouble identification processing will be explained with reference to FIG. 6. The trouble identification processing is processing to identify the type of the device trouble occurring in the faulty terminal, and is performed in parallel with the support processing. When the trouble identification processing at step S21 in FIG. 4 is started, the CPU 111 transmits a trouble questionnaire screen display command (step S51), as shown in FIG. 6. The trouble questionnaire screen display command is a command that causes a trouble questionnaire screen 50 shown in FIG. 10 to be displayed on the display portion 126 of the faulty terminal.

Figure 10:
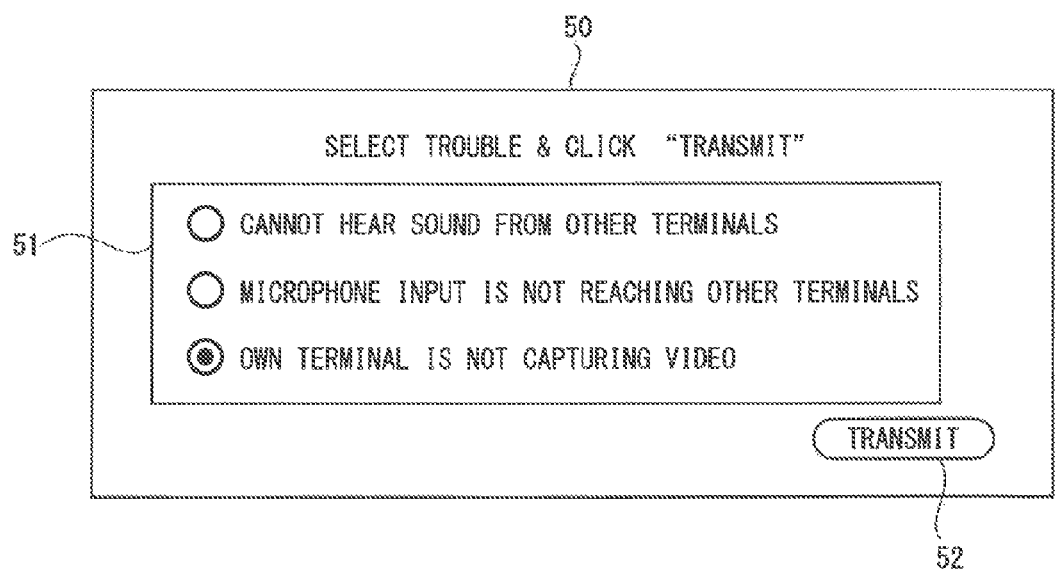
FIG. 10 is a diagram showing a trouble questionnaire screen.

As shown in FIG. 10, the trouble questionnaire screen 50 has an item box 51 and a transmit button 52. For example, three items are provided in the item box 51, such as "Cannot hear sound from other terminals," "Microphone input is not reaching other terminals," and "Own terminal is not capturing video." The user 13B of the faulty terminal selects the item relating to the phenomenon occurring on the faulty terminal from the item box 51, by operating the input portion 128. The user 13B can transmit the trouble questionnaire response to the conference management server device 11 by operating the transmit button 52. In other words, the trouble questionnaire response includes information identifying the type of the device trouble occurring in the faulty terminal. In the example shown in FIG. 10, a case is shown in which the user 13B of the faulty terminal requests the teleconference system 1 for support to resolve the trouble that his/her own terminal is not capturing video images. In this case, as shown in FIG. 10, the user 13B of the faulty terminal selects "Own terminal is not capturing video" from the items in the item box 51, and operates the transmit button 52.

The CPU 111 determines whether or not the trouble questionnaire response has been received from the faulty terminal (step S52). When the trouble questionnaire response has not been received from the faulty terminal (no at step S52), the CPU 111 repeats the determination at step S52 until the trouble questionnaire response is received. When the trouble questionnaire response has been received from the faulty terminal (yes at step S52), the CPU 111 acquires the received trouble questionnaire response (step S53). The CPU 111 stores the acquired trouble questionnaire response in the RAM 113.

When, in the trouble questionnaire response, "Cannot hear sound from other terminals" has been selected, it is assumed that the trouble is occurring in the speaker 130 of the faulty terminal. When, in the trouble questionnaire response, "Microphone input is not reaching other terminals" has been selected, it is assumed that the trouble is occurring in the microphone 129 of the faulty terminal. When, in the trouble questionnaire response, "Own terminal is not capturing video" has been selected, it is assumed that the trouble is occurring in the camera 125 of the faulty terminal. The user 13B of the faulty terminal can transmit the trouble questionnaire response, which identifies the type of the device trouble, to the conference management server device 11. The conference management server device 11 can receive the trouble questionnaire response that is able to identify the type of the trouble occurring in the faulty terminal, in a questionnaire format from the faulty terminal.

Based on the trouble questionnaire response, the user 13C of the support terminal can clearly identify the cause of the device trouble occurring in the faulty terminal. Note that the trouble questionnaire screen 50 is not limited to this example, and items other than the three items shown in FIG. 10 may be included, or a free input box in which content of the device trouble can be freely input may be included.

The CPU 111 determines whether or not the support session is established (step S54). The CPU 111 determines whether or not the support session is established by referring to a state of the support session flag. When the support session is not established (no at step S54), the CPU 111 repeats the determination at step S54 until the support session is established. When the support session is established (yes at step S54), the CPU 111 transmits the trouble questionnaire response stored in the RAM 113 to the support terminal (step S55) and ends the trouble identification processing.

The explanation returns to the explanation of FIG. 3. The CPU 111 determines whether or not the support session is established (step S13). The CPU 111 determines whether or not the support session is established by referring to the state of the support session flag. When the support session is established (yes at step S13), the CPU 111 performs first transmission/reception processing (step S14) and moves the processing to a determination at step S16.

Figure 7:
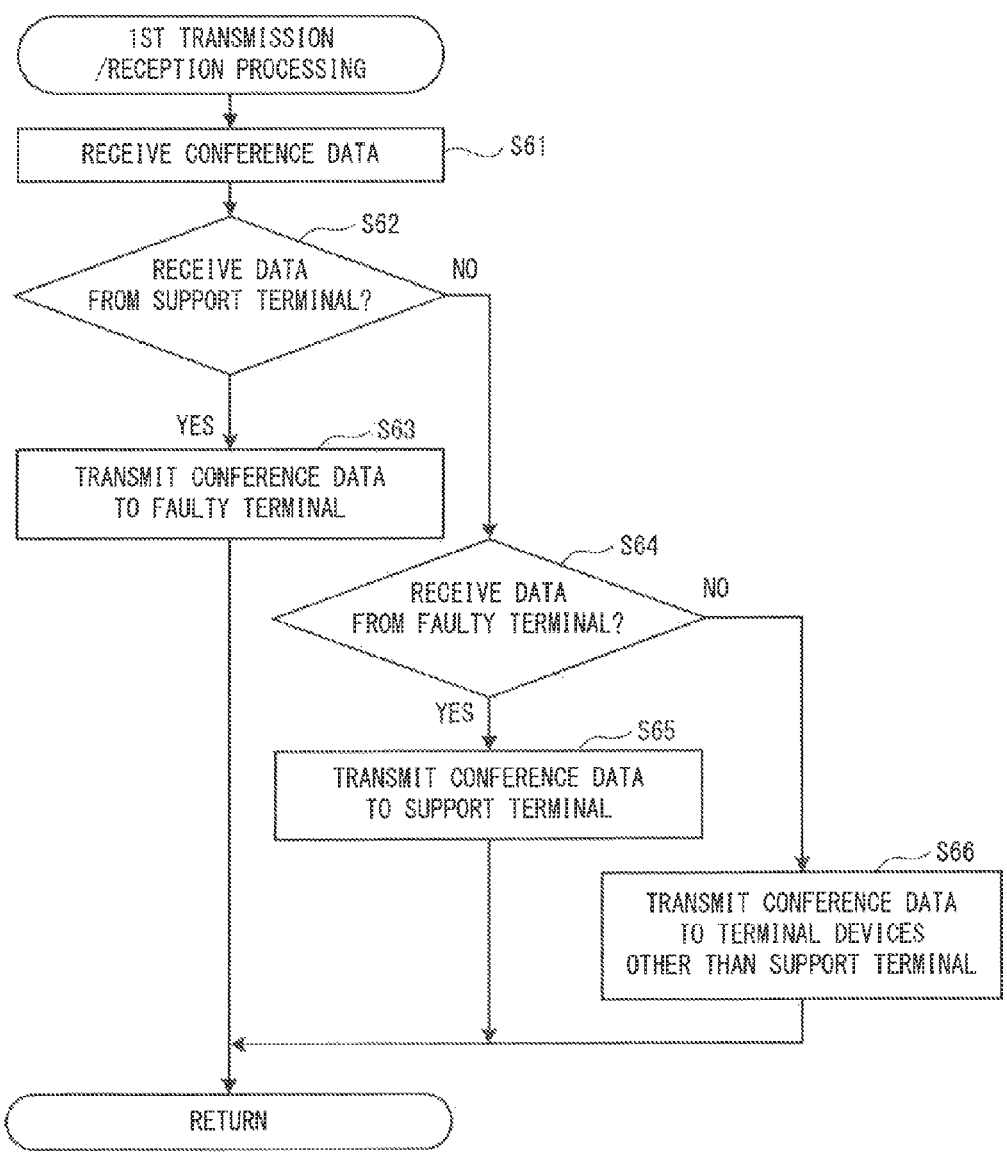
FIG. 7 is a flow chart of first transmission/reception processing.

The first transmission/reception processing (refer to step S14 in FIG. 3) will be explained with reference to FIG. 7. The first transmission/reception processing is processing to prescribe a transmission destination of the conference data depending on a transmission source of the conference data, when the support session is established. Specifically, when the support session is established during the conference room session, the CPU 111 performs the transmission and reception of the conference data in the first transmission/ reception processing. As shown in FIG. 7, when the first transmission/reception processing is started, the CPU 111 receives the conference data (step S61). The CPU 111 determines whether or not the received conference data is data that has been transmitted from the support terminal, based on information that is included in the header area of the conference data and that identifies the terminal device 12 that is the transmission source (step S62).

When the conference data is the data that has been transmitted from the support terminal (yes at step S62), the CPU 111 transmits the conference data to the faulty terminal (step S63) and returns the processing to the support processing (refer to FIG. 3). Here, in the processing at step S63, the CPU 111 may transmit the conference data received from the support terminal to at least the faulty terminal. In the processing at step S63, the CPU 111 may also transmit the conference data received from the support terminal to the terminal device 12 other than the faulty terminal, such as the chairperson terminal, for example.

On the other hand, when the conference data is not the data that has been transmitted from the support terminal (no at step S62), the CPU 111 determines whether or not the conference data is data that has been transmitted from the faulty terminal, based on the information that is included in the header area of the conference data and that identifies the terminal device 12 that is the transmission source (step S64). When the conference data is the data that has been transmitted from the faulty terminal (yes at step S64), the CPU 111 transmits the conference data to the support terminal (step S65) and returns the processing to the support processing. Here, in the processing at step S65, the CPU 111 may transmit the conference data received from the faulty terminal to at least the support terminal. In the processing at step S65, the CPU 111 may also transmit the conference data received from the faulty terminal to the terminal device 12 other than the support terminal (such as the chairperson terminal, for example).

Note that, with respect to the conference data transmitted and received between the faulty terminal and the support terminal in the processing at step S63 and step S65, the CPU 111 performs the transmission and reception based on the communication settings set in the above-described support setting processing (refer to FIG. 5) at step S43 or step S44, and step S47. The faulty terminal and the support terminal can mutually transmit and receive the conference data in the support session by using the sound, video, chat, video recording and remote desktop functions, within a range not limited by the settings made at step S43 or step S44, and step S47. The user 13B of the faulty terminal and the user 13C of the support terminal can directly communicate with each other about the content of the device trouble of the faulty terminal, by using these functions. In particular, when the "Sound" function can be used between the support terminal and the faulty terminal, it is easy for the user 13B of the faulty terminal and the user 13C of the support terminal to understand each other. This is because it is easy for the user 13C of the support terminal to investigate the cause of the device trouble of the faulty terminal. Thus, the teleconference system 1 can rapidly resolve the device trouble of the faulty terminal.

On the other hand, when the conference data is not the data that has been transmitted from the faulty terminal (no at step S64), of the terminal devices 12 that are conference-connected to the conference room, the CPU 111 transmits the conference data to the terminal devices 12 other than the support terminal (step S66). The CPU 111 returns the processing to the support processing. The conference data that has not been transmitted from the support terminal, nor transmitted from the faulty terminal is the conference data that has been transmitted from the terminal devices 12 of the original participants, including the chairperson terminal. It is possible that this type of the conference data may include information that is confidential and that should not be transmitted to the support terminal. The CPU 111 never transmits this type of the confidential conference data to the support terminal, and can thus cause the support terminal to engage in resolving the device trouble of the faulty terminal, while protecting the confidentiality of the conference data. Further, even when the support session is established between the faulty terminal and the support terminal, there is a case in which the user 13B of the faulty terminal can sufficiently respond to the conference content shown by the conference data of the conference room session. Therefore, in the processing at step S66, the CPU 111 transmits the conference data to the faulty terminal. It should be noted that there is a case in which the user 13B of the faulty terminal in the support session wishes to concentrate on the communication with the user 13C of the support terminal. Further, when the document data of the conference room session is transmitted to the faulty terminal that is in the support session, if the user 13C of the support terminal uses the remote desktop function, it is possible the document data shared by the other terminal devices 12 and the faulty terminal can become known to the user 13C of the support terminal, via the faulty terminal. Taking this case into account, a configuration may be adopted in which the CPU 111 does not transmit the conference data of the conference room session to the faulty terminal while the support session is established between the faulty terminal and the support terminal. Further, the CPU 111 may determine whether or not to transmit the conference data to the faulty terminal in accordance with information that is included in the header area of the conference data of the conference room session and that identifies a type of the data.

A specific example of the main window 20A on the display portion 126 of the chairperson terminal when the first transmission/reception processing is being performed will be explained with reference to FIG. 11. In the specific example, it is assumed that the trouble is occurring in the camera 125 of the faulty terminal. In this case, as shown in FIG. 11, documentation 21A, which corresponds to the conference data and which is transmitted from the chairperson terminal in the processing at step S66 (refer to FIG. 7) is displayed in the document window 21 of the main window 20A. Further, as described above, in the processing at step S63, the CPU 111 may transmit the conference data transmitted from the support terminal to the chairperson terminal. In FIG. 11, a mode is shown in which video images of the user 13C of the support terminal transmitted from the support terminal are displayed in the video window 22C, in the main window 20A. Furthermore, as described above, in the processing at step S65, the CPU 111 may transmit the conference data transmitted from the faulty terminal to the chairperson terminal. However, in the present specific example, the trouble is occurring in the camera 125 of the faulty terminal, and thus the video images of the user 13B of the faulty terminal that should normally be displayed in the video window 22B are not displayed in the main window 20A. Note that, when the sound data of the conference data of the conference room session, and the sound data of the support session are both transmitted to the terminal devices 12 of the other participants, including the chairperson terminal, there is a case in which this is an obstacle to the smooth running of the conference, due to the superposition of the plurality of sound data in the chairperson terminal. Taking this type of case into account, the CPU 111 may determine whether or not to transmit the conference data of the support session to the terminal devices 12 of the other participants including the chairperson terminal, depending on information that is included in the header area of the conference data of the support session and that identifies the type of the data.

Figure 12:
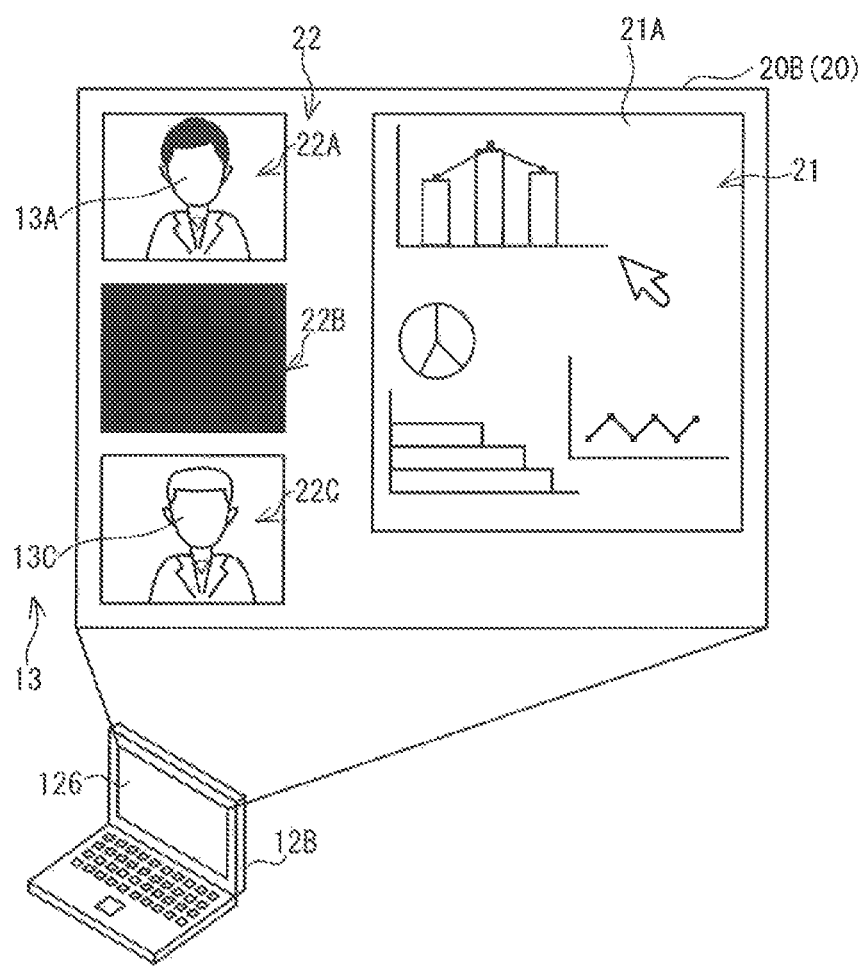
FIG. 12 is a diagram showing a main window.

A specific example of a main window 20B on the display portion 126 of the faulty terminal when the first transmission/reception processing is being performed will be explained with reference to FIG. 12. The conference data transmitted from the support terminal in the processing at step S63 is transmitted to the faulty terminal. Thus, as shown in FIG. 12, in the main window 20B, the video images of the user 13C of the support terminal transmitted from the support terminal are displayed in the video window 22C. Also, in the processing at step S66, the documentation 21A that corresponds to the conference data transmitted from the chairperson terminal, which is the terminal device 12 other than the support terminal and the faulty terminal, is displayed in the document window 21 of the main window 20B. Further, the video images of the user 13A of the chairperson terminal transmitted from the chairperson terminal are displayed in the video window 22A. In this way, while performing the communication with the support terminal in order to resolve the device trouble occurring in the faulty terminal, the user 13B of the faulty terminal can also deal with the conference data being transmitted and received in the conference room session. Note that, in the present specific example, the trouble is occurring in the camera 125 of the faulty terminal, and thus the video images of the user 13B of the faulty terminal that should be normally displayed in the video window 22B are not displayed in the main window 20B.

Figure 13:
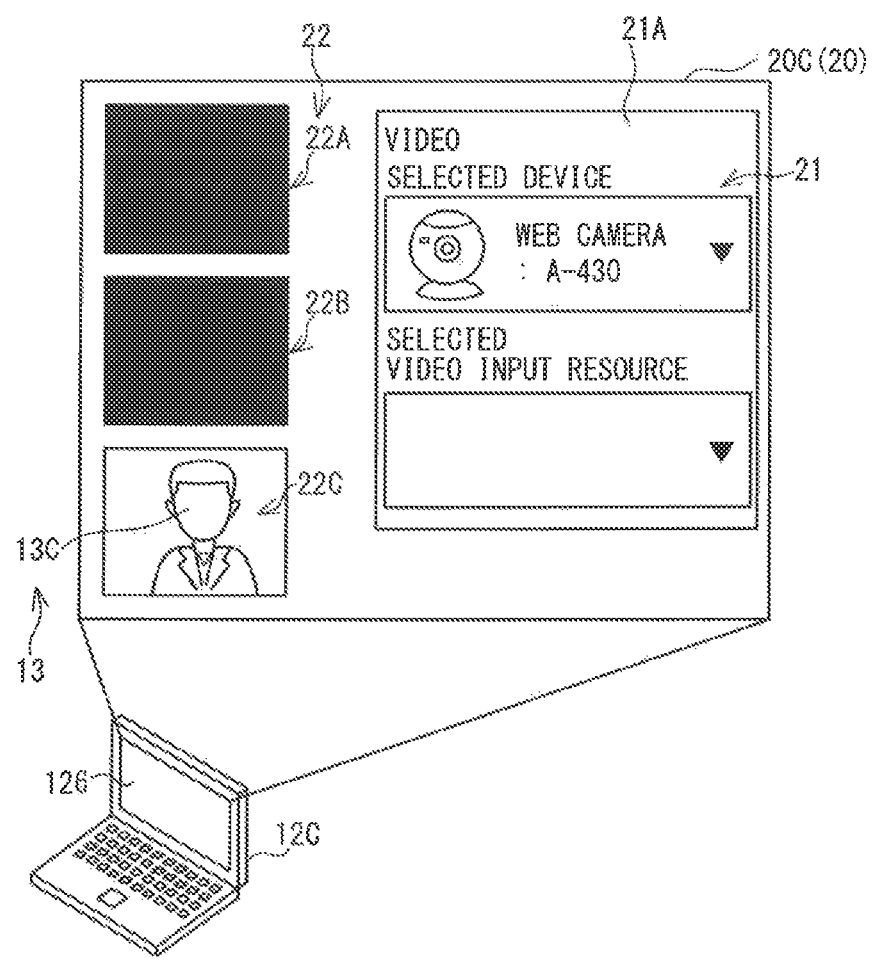
FIG. 13 is a diagram showing a main window.

A specific example of a main window 20C on the display portion 126 of the support terminal when the first transmission/reception processing is being performed will be explained with reference to FIG. 13. As shown in FIG. 13, the documentation 21A that corresponds to the conference data transmitted from the chairperson terminal and that is displayed in the document windows 21 of the main window 20A shown in FIG. 11 and the main window 20B shown in FIG. 12 is not displayed in the main window 20C. This is because, in the processing at step S66, the conference data transmitted from the chairperson terminal, which is the terminal device 12 other than the support terminal and the faulty terminal, is restricted so that it is not transmitted to the support terminal. In a similar manner, the video data corresponding to the video images of the user 13A of the chairperson terminal that is transmitted from the chairperson terminal to the conference management server device 11 is also not transmitted to the support terminal, and thus the video images of the user 13A of the chairperson terminal are not displayed in the video window 22A. In this way, the conference data of the conference room session is not transmitted to the support terminal, and thus the confidentiality of the conference data of the conference room session is secured.

As shown in FIG. 13, in the document window 21 of the main window 20C, a state is displayed in which the user 13C of the support terminal is using the remote desktop function and remotely operating the desktop of the faulty terminal. More specifically, the state in which the user 13C of the support terminal is remotely operating the desktop of the faulty terminal and adjusting the settings of the camera 125 connected to the faulty terminal is displayed in the document window 21 of the main window 20C. In addition to the remote desktop function, the user 13C of the support terminal can use the sound or the chat functions etc., and can attempt to adjust the settings of the camera 125 connected to the faulty terminal.

Figure 8:
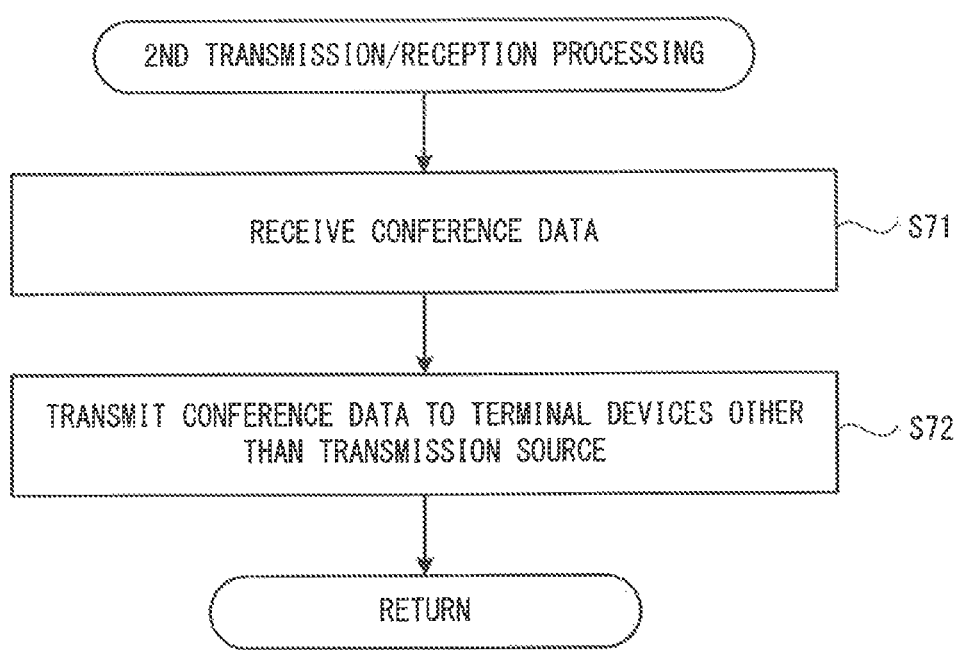
FIG. 8 is a flow chart of second transmission/reception processing.

The explanation returns to FIG. 3. When the support session is not established (no at step S13), the CPU 111 performs second transmission/reception processing (step S15), and moves the processing to a determination at step S16. The second transmission/reception processing (refer to step S15, FIG. 3) will be explained with reference to FIG. 8. As shown in FIG. 8, when the second transmission/reception processing is started, the CPU 111 receives the conference data (step S71). The CPU 111 transmits the received conference data to the terminal devices 12 other than the transmission source of the conference data (step S72), and returns the processing to the support processing (refer to FIG. 3). In this way, the terminal devices 12 that are conference-connected to the conference room session can mutually transmit and receive the conference data.

The explanation returns to FIG. 3. The CPU 111 determines whether or not a support end notification has been received from the support terminal (step S16). The support end notification is data generated by the support terminal to notify the conference management server device 11 that the support session is to be ended. The support terminal generates the support end notification when the support terminal ends the support session, as a result of, for example, resolving the device trouble that occurred in the faulty terminal. The support terminal transmits the generated support end notification to the conference management server device 11. When the support end notification has not been received (no at step S16), the CPU 111 returns the processing to the determination at step S11. When the support end notification has been received (yes at step S16), the CPU 111 performs support end processing (step S17), and returns the processing to the determination at step S11.

Figure 9:
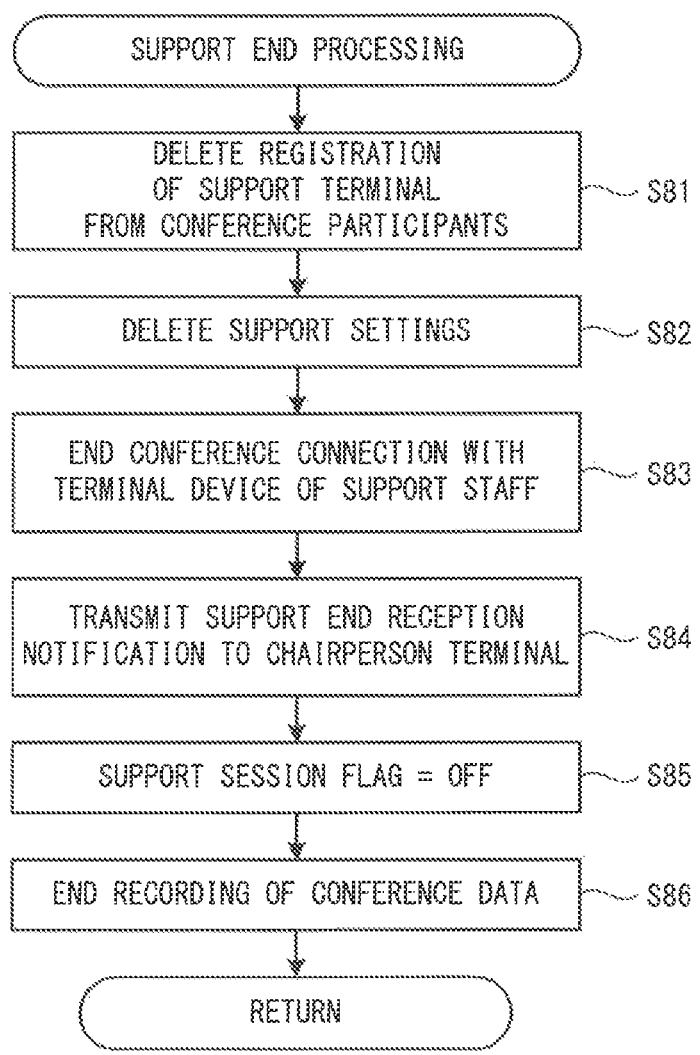
FIG. 9 is a flow chart of support end processing.

The support end processing (refer to step S17, FIG. 3) will be explained with reference to FIG. 9. The support end processing is processing to end the support session in response to the reception of the support end notification from the support terminal. The CPU 111 deletes, from the conference table 40, the user ID, the terminal device ID and the role information of the support terminal registered in the conference table 40 of the storage portion 114 (step S81). The CPU 111 deletes the content of the settings at step S43 or step S44, and step S47 (refer to FIG. 5) stored in the RAM 113 (step S82). The CPU 111 ends the conference connection with the terminal device 12C of the support staff member for which the role of support staff has been deleted (step S83). The CPU 111 does not establish the subsequent conference room session with the terminal device 12C of the support staff member, and further, does not perform the subsequent support session with the faulty terminal.

The CPU 111 transmits a support end reception notification to the chairperson terminal (step S84). The support end reception notification is data to notify the chairperson terminal that the support end notification has been received from the support terminal, and that the support session is to be ended by deleting registration information, such as the user ID etc. of the support terminal, from the conference table 40. When the CPU 121 of the chairperson terminal receives the support end reception notification, a support end reception notification display 63 shown in FIG. 11 is displayed as the pop-up display 60. The chairperson, who is the user 13A of the chairperson terminal, can ascertain that the conference connection of the support terminal to the conference room session has ended, by visually recognizing the support end reception notification display 63. The chairperson can smoothly conduct the conference while ascertaining that the support session has ended during the conference room session.

The CPU 111 sets the support session flag to "OFF" (step S85). The CPU 111 ends the recording of the conference data (step S86). When the device trouble that occurred in the faulty terminal is resolved in the support session, the faulty terminal is able to subsequently deal with the conference data of the conference room session. Therefore, the CPU 111 ends the recording of the subsequent conference data in accordance with the ending of the support session during the conference room session. After that, the CPU 111 returns the processing to the support processing (refer to FIG. 3). Note that, in the processing at step S85, the support session flag is set to "OFF" and therefore, at step S13 of the subsequent support processing (refer to FIG. 3), it is determined that the support session is not established (no at step S13), and the second transmission/reception processing at step S15 is performed (refer to FIG. 8). As a result, after the support session is ended, the conference data is mutually transmitted and received between the terminal devices 12, including the terminal device 12B for which the device trouble has been resolved.

As described above, when the CPU 111 receives the support request notification from the faulty terminal (step S11), the CPU 111 performs the support participation request with respect to the terminal device 12C of the support staff member (step S24). The terminal device 12C of the support staff member is the terminal device 12 that is set in advance, and is the terminal device 12 that is not participating in the conference room. The CPU 111 registers the user ID, the terminal device ID, and the role information of the terminal device 12C of the support staff member that is set in advance in the conference table 40 of the storage portion 114. The CPU 111 compares the terminal device ID of the terminal device 12C of the support staff member that has transmitted the support response notification with the terminal device ID registered in the conference table 40 and performs the authentication, then performs the conference connection processing by communicating with the support terminal for which the authentication has been successful (step S28). The CPU 111 sets the support session flag to "ON," which indicates that the support session is established between the faulty terminal and the support terminal (step S32). As the support session is established (yes at step S13), the CPU 111 performs the first transmission/reception processing (step S14). In the first transmission/reception processing, the conference data transmitted from the terminal devices 12 of the conference participants, including the chairperson terminal, is not transmitted to the support terminal. On the other hand, in the first transmission/reception processing, the mutual communication between the support terminal and the faulty terminal is secured (refer to FIG. 7). Therefore, the conference management server device 11 does not transmit, to the support terminal, the confidential information that should not be transmitted to the support terminal, and can also cause the support terminal to appropriately respond to the device trouble of the faulty terminal.

In the first transmission/reception processing, the CPU 111 performs the transmission and reception of the conference data using the communication settings set in the support setting processing (refer to FIG. 5) at step S43 or step S44, and step S47. The faulty terminal and the support terminal can mutually transmit and receive the data of the support session by using the sound, video, chat, video recording and remote desktop functions, within a range not limited by the settings made at step S43 or step S44, and step S47. In particular, when the conference management server device 11 can use the "Sound" function in the mutual communication between the support terminal and the faulty terminal, it is possible to cause the user 13C of the support terminal to appropriately respond to the device trouble of the faulty terminal.

When the CPU 111 has received the support end notification from the support terminal (yes at step S16), the registration of the user ID, the terminal device ID, and the role information of the support terminal is deleted from the conference table 40 (step S81). The CPU 111 ends the conference connection with the terminal device 12C of the support staff member whose role as the support staff has been deleted (step S83). The CPU 111 sets the support session flag to "OFF" (step S85). In this way, in the determination processing at step S13 of the subsequent support processing, it is determined that the support session is no established (no at step S13), and the second transmission/reception processing at step S15 is performed (refer to FIG. 8). Thus, after the support session has ended, the conference management server device 11 can smoothly conduct the conference room session, by causing the conference data to be transmitted and received between the terminal devices 12 including the terminal device 12B for which the device trouble has been resolved.

When the support session is established during the conference room session, the user 13B of the faulty terminal performs various types of communication with the user 13C of the support terminal, in order to resolve the device trouble. In this case, there is the possibility that the user 13B of the faulty terminal may fail to deal with the conference data being transmitted and received in the conference room session. The CPU 111 starts the recording of the conference data when the support session is established (step S33). Further, the CPU 111 ends the recording of the conference data (step S86) when the support session flag is set to "OFF" (step S85). As a result, the user 13B of the faulty terminal can ascertain the content of the conference data by accessing the recording of the conference data stored in the storage portion 114 after the conference room session has ended, for example.

When the CPU 111 receives the support response notification from the terminal device 12C of the support staff member (step S25), the CPU 111 transmits the support staff registration notification to the chairperson terminal (step S29). Further, when the CPU 111 receives the support end notification from the terminal device 12C of the support staff member (yes at step S16), the CPU 111 transmits the support end reception notification to the chairperson terminal (step S84). When the CPU 121 of the chairperson terminal has received the support staff registration notification, the support staff registration notification display 62 (refer to FIG. 11) is displayed in the main window 20A. When the CPU 121 of the chairperson terminal has received the support end reception notification, the support end reception notification display 63 (refer to FIG. 11) is displayed in the main window 20A. By visually recognizing the support staff registration notification display 62 or the support end reception notification display 63, the user 13A (the chairperson) of the chairperson terminal can ascertain that the support terminal has been conference-connected during the conference room session, or that the support session by the support terminal has ended. In this way, the conference management server device 11 allows progress of the support by the support terminal to be ascertained by the terminal device 12A used by the chairperson, on which is set the greatest number of functions that can be used by the participants in the conference room session and which has special authority. As a result, the chairperson can smoothly conduct the conference room session.

In the present embodiment, the terminal device ID and the device information of the faulty terminal are included in the support request notification that is transmitted to the conference management server device 11 by the faulty terminal. The terminal device ID of the faulty terminal is the identification information to identify the faulty terminal. The device information of the faulty terminal is the information that allows the type of OS etc. of the faulty terminal to be identified. By performing the support participation request, the CPU 111 transmits the terminal device ID and the device information of the faulty terminal to the terminal device 12C of the support staff member. Further, the CPU 111 receives the trouble questionnaire response from the faulty terminal (step S45). The trouble questionnaire response includes the information to identify the type of the device trouble occurring in the faulty terminal. The CPU 111 transmits the received trouble questionnaire response to the support terminal (step S55). The support terminal receives these necessary pieces of information transmitted from the conference management server device 11 in order to deal with the device trouble occurring in the faulty terminal. As a result, the user 13C of the support terminal can deal with the device trouble of the faulty terminal based on the trouble questionnaire response, after having identified the faulty terminal from among the terminal devices 12 and having identified the device information of the faulty terminal.

Figure 5:
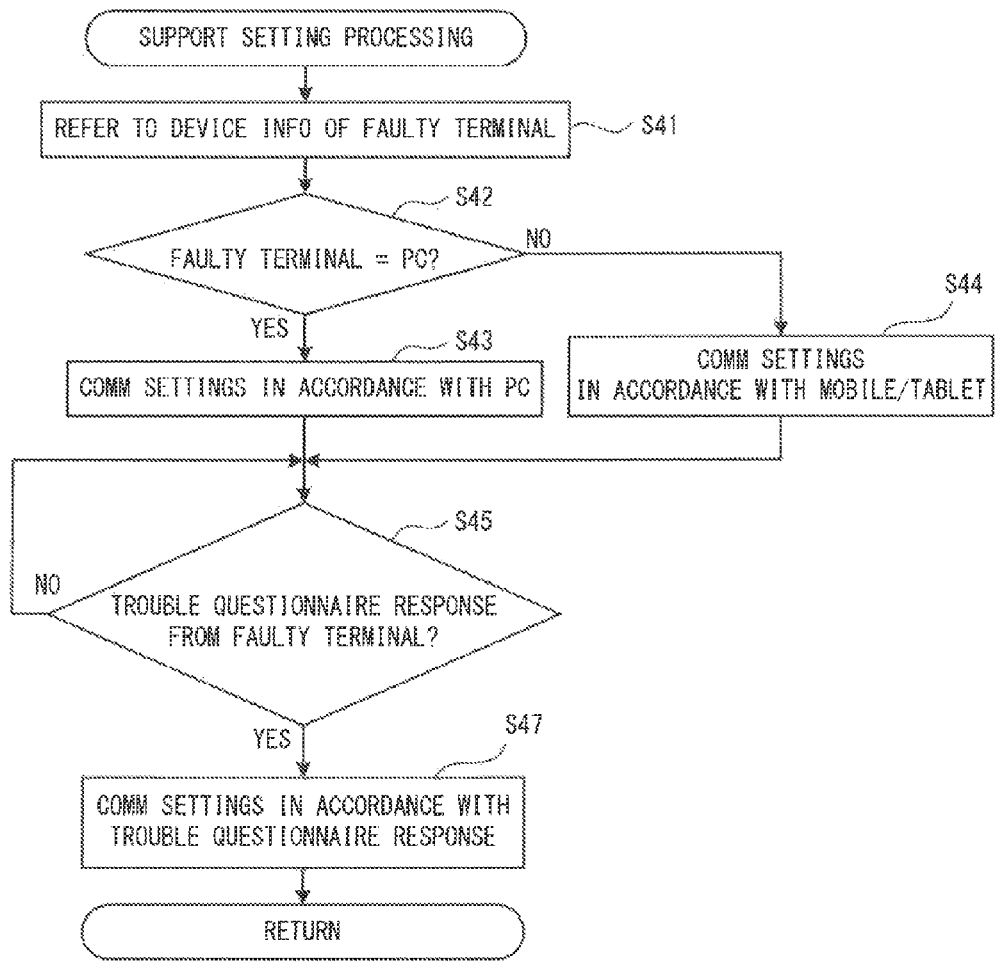
FIG. 5 is a flow chart of support setting processing.

The CPU 111 performs the communication between the faulty terminal and the support terminal in the first transmission/reception processing based on the setting content of step S43 or step S44, and step S47 of the support setting processing (refer to FIG. 5). Thus, the CPU 111 can cause the faulty terminal and the support terminal to communicate with each other depending on whether or not the faulty terminal is the PC, and depending on the type of device trouble occurring in the faulty terminal. As a result, the conference management server device 11 can cause the support terminal to appropriately deal with the device trouble occurring in the faulty terminal.

It should be noted that the present disclosure is not limited to the above-described embodiment, and various modifications are possible. In the above-described embodiment, at the processing at step S26, the CPU 111 registers the user ID, the terminal device ID, and the role information of "Support staff" of the terminal device 12C of the support staff member in the conference table 40 in association with the corresponding conference room ID. At step S26, it is sufficient that processing be performed such that the terminal device 12C of the support staff member is allowed, by the teleconference system 1, to participate in the conference room as the support terminal. Thus, the user ID, the terminal device ID, and the role information of the terminal device 12C of the support staff member need not necessarily be registered in the conference table 40. Further, the authentication of the terminal device 12 for the conference connection need not necessarily be performed based on the conference table 40, and the conference table 40 itself need not necessarily exist in the teleconference system 1.

At step S81, the conference connection of the support terminal that has participated in the conference room session may be cancelled, and processing may be performed to cause the support terminal to exit the conference room. In other words, processing may be performed to return the support terminal to a status of being the terminal device 12 that does not participate in the conference room and that is not participating in the conference room, in the same manner as before the support terminal was conference-connected as the support terminal. Therefore, as the processing to cancel the conference connection of the support terminal, the processing to delete, from the conference table 40, the user ID, the terminal device ID, and the role information of the support terminal that were registered in the conference table 40 need not necessarily be performed.

In the above-described embodiment, the terminal device ID and the device information of the faulty terminal are included in the support request notification received by the CPU 111 from the faulty terminal at step S11. The support request notification need not necessarily include the terminal device ID and the device information of the faulty terminal. For example, with the support request notification, at first, only a request for support to resolve trouble in the teleconference system 1 may be notified to the conference management server device 11. A configuration may be adopted in which, after that, the terminal device ID and the device information of the faulty terminal are transmitted from the faulty terminal at a different timing to the support request notification, and the CPU 111 receives the transmitted terminal device ID and device information of the faulty terminal. In this case, the conference management server device 11 may receive the terminal device ID and the device information of the faulty terminal in a questionnaire format that is similar to the trouble questionnaire response of the above-described embodiment.

In the above-described embodiment, the CPU 111 receives the support request notification from the faulty terminal at step S11, and receives the trouble questionnaire response from the faulty terminal at step S45 and step S52. In other words, the CPU 111 receives the support request notification and the trouble questionnaire response from the faulty terminal at different timings. The CPU 111 may receive the support request notification and the trouble questionnaire response at the same timing. For example, the trouble questionnaire response may be included in the support request notification received by the CPU 111 from the faulty terminal at step S11. For example, the conference application may be configured such that, when the terminal device 12 generates the support request notification, the trouble questionnaire screen 50 is displayed on the display portion 126 so as to demand a specific response from the user 13. Then, the conference application may be configured such that the support request notification which includes the obtained trouble questionnaire response is transmitted.

In the above-described embodiment, the CPU 111 respectively transmits, to the chairperson terminal, the support request reception notification at step S23, the support staff registration notification at step S29, and the support end reception notification at step S84. All of these notifications need not necessarily be transmitted to the chairperson terminal, and the conference management server device 11 may selectively transmit the notification, of these notifications, to the chairperson terminal as appropriate. In the above-described embodiment, of the participants in the conference room, each of the above-described notifications is transmitted to the chairperson terminal used by the chairperson, but each of the above-described notifications may be transmitted to the terminal device 12 used by the user 13 other than the chairperson, for example, such as the "Presenter" or the like. Further, each of the above-described notifications may be transmitted to the terminal devices 12 used by all of the participants in the conference room, including the faulty terminal and the support terminal.

In addition, in the above-described embodiment, in accordance with the reception of each of the above-described notifications, one of the support request reception notification display 61, the support staff registration notification display 62, and the support end reception notification display 63 shown in FIG. 11 is displayed in the main window 20A of the chairperson terminal. The information displayed in the support request reception notification display 61, the support staff registration notification display 62, and the support end reception notification display 63 is not limited to the examples shown in FIG. 11. For example, when the CPU 111 transmits the support request reception notification to the chairperson terminal at step S23, the CPU 111 may transmit the terminal device ID etc. of the faulty terminal at the same time. In this case, the CPU 121 of the chairperson terminal can add information based on the terminal device ID of the faulty terminal to the support request reception notification display 61 displayed in the main window 20A. Similarly, when the CPU 111 transmits the support staff registration notification to the chairperson terminal at step S29, the CPU 111 may transmit the terminal device ID of the faulty terminal and the terminal device ID of the support terminal at the same time. In this case, the CPU 121 of the chairperson terminal can cause information indicating which of the terminal devices 12 has started the support session to be displayed on the support staff registration notification display 62 displayed in the main window 20A.

In the above-described embodiment, the example is explained in which the device trouble occurs in the faulty terminal that is the terminal device 12 other than the chairperson terminal. For example, when the device trouble occurs in the chairperson terminal, the support session may be established between the chairperson terminal and the support terminal. In this case, in the first transmission/reception processing (refer to FIG. 7), the conference data transmitted from the support terminal is transmitted to the chairperson terminal (yes at step S62; step S63). Further, the conference data transmitted from the chairperson terminal is transmitted to the support terminal (yes at step S64; step S65). In addition, the conference data that is transmitted from the terminal devices 12 of the participants other than the chairperson terminal and the support terminal is transmitted to the terminal devices 12 other than the support terminal (step S66).

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A non-transitory computer-readable medium storing computer-readable instructions that, when executed, cause a processor of a teleconference management server device configured to manage a teleconference via a network to perform steps comprising:

receiving, from a first terminal device participating in the teleconference, first identification information identifying the first terminal device, and status information indicating a participation status in the teleconference of the first terminal device;

transmitting a first request including the first identification information and the status information to a second terminal device, the second terminal device being a terminal device that is set in advance and that is not participating in the teleconference;

receiving, from the second terminal device, a first response in response to the first request;

setting, in response to receiving the first response, the second terminal device as a registered second terminal device whose participation in the teleconference is registered; and starting first transmission/reception processing in response to setting the registered second terminal device, the first transmission/reception processing transmitting first conference data received from the first terminal device to the registered second terminal device, transmitting second conference data received from the registered second terminal device to the first terminal device, and not transmitting third conference data received from a third terminal device participating in the teleconference to the registered second terminal device, the third terminal device being different from the first terminal device and the second terminal device.

2. The non-transitory computer-readable medium according to claim 1, wherein the first transmission/reception processing transmits first data including sound data included in the first conference data to the registered second terminal device, and transmits second data including sound data included in the second conference data to the first terminal device.

3. The non-transitory computer-readable medium according to claim 1, wherein the computer-readable instructions further cause the processor to perform steps comprising:
receiving, from the registered second terminal device, a second request requesting end of the first transmission/reception processing;
deleting, in response to receiving the second request, a participation registration setting of the registered second terminal device participating in the teleconference; and
changing, in response to deleting the participation registration setting of the registered second terminal device, the first transmission/reception processing to second transmission/reception processing transmitting the first conference data to the third terminal device and transmitting the third conference data to the first terminal device.

4. The non-transitory computer-readable medium according to claim 3, wherein the computer-readable instructions further cause the processor to perform steps comprising:
starting storing of the third conference data into a storage device in response to starting the first transmission/reception processing; and
ending the storing of the third conference data into the storage device in response to changing the first transmission/reception processing to the second transmission/reception processing.

5. The non-transitory computer-readable medium according to claim 3, wherein the computer-readable instructions further cause the processor to perform a step comprising:
transmitting a predetermined notification to a specific terminal device in a case that the first response is received from the second terminal device, and in a case that the second request is received from the registered second terminal device, the specific terminal device being one of a plurality of the third terminal devices and having a specific authority in the teleconference.

6. The non-transitory computer-readable medium according to claim 1, wherein the computer-readable instructions further cause the processor to perform steps comprising:
receiving trouble information indicating content of a trouble occurring in the first terminal device; and
transmitting the trouble information to the registered second terminal device.

7. The non-transitory computer-readable medium according to claim 6, wherein:
the first identification information includes device information of the first terminal device,
the computer-readable instructions further cause the processor to perform a step comprising:
determining, based on at least one of the device information and the trouble information, a transmission format of the first conference data for transmission to the registered second terminal device in the first transmission/reception processing, and a transmission format of the second conference data for transmission to the first terminal device in the first transmission/reception processing, and
the first transmission/reception processing is started in accordance with the transmission format of the first conference data and the transmission format of the second conference data.

8. A teleconference management method via a network comprising the steps of:
receiving, from a first terminal device participating in a teleconference, first identification information identifying the first terminal device, and status information indicating a participation status in the teleconference of the first terminal device;
transmitting a first request including the first identification information and the status information to a second terminal device, the second terminal device being a terminal device that is set in advance and that is not participating in the teleconference;
receiving, from the second terminal device, a first response in response to the first request;
setting, in response to receiving the first response, the second terminal device as a registered second terminal device whose participation in the teleconference is registered;
receiving conference data in response to setting the registered second terminal device;
identifying a transmission destination of the conference data, based on information included in the received conference data, such that when the first identification information is included in the conference data, the second terminal device is identified as the transmission destination, when second identification information identifying the second terminal device is included in the conference data, the first terminal device is identified as the transmission destination, and when third identification information identifying a third terminal device participating in the teleconference is included in the conference data, at least a part of a plurality of terminal devices including the first terminal device and the third terminal device and not including the second terminal device is identified as the transmission destination, the third terminal device being different from the first terminal device and the second terminal device; and
transmitting the conference data to the identified transmission destination.

9. A teleconference management server device configured to manage a teleconference via a network, the teleconference management server device comprising:
a processor configured to control the teleconference management server device to perform the steps of:
receiving, from a first terminal device participating in the teleconference, first identification information identifying the first terminal device, and status information indicating a participation status in the teleconference of the first terminal device;
transmitting a first request including the first identification information and the status information to a second terminal device, the second terminal device being a terminal device that is set in advance and that is not participating in the teleconference;
receiving, from the second terminal device, a first response in response to the first request;
setting, in response to receiving the first response, the second terminal device as a registered second terminal device whose participation in the teleconference is registered; and
starting first transmission/reception processing in response to setting the registered second terminal, the first transmission/reception processing transmitting first conference data received from the first terminal device to the registered second terminal device, transmitting second conference data received from the registered second terminal device to the first terminal device, and not transmitting third conference data received from a third terminal device participating in the teleconference to the registered second terminal device, the third terminal device being different from the first terminal device and the second terminal device.

\* \* \* \* \*